United States Patent
Chu et al.

(10) Patent No.: US 10,791,516 B1
(45) Date of Patent: Sep. 29, 2020

(54) METHODS AND APPARATUS FOR ALLOCATING PHYSICAL RESOURCES OF A WIRELESS NETWORK TO CLIENT DEVICES

(71) Applicant: NXP USA, Inc., Austin, TX (US)

(72) Inventors: Liwen Chu, San Ramon, CA (US);
Jinjing Jiang, San Jose, CA (US);
Hongyuan Zhang, Fremont, CA (US);
Hui-Ling Lou, Sunnyvale, CA (US)

(73) Assignee: NXP USA, INC., Austin, TX (US)

( * ) Notice: Subject to any disclaimer, the term of this patent is extended or adjusted under 35 U.S.C. 154(b) by 37 days.

(21) Appl. No.: 16/150,162

(22) Filed: Oct. 2, 2018

Related U.S. Application Data

(60) Provisional application No. 62/572,313, filed on Oct. 13, 2017.

(51) Int. Cl.
*H04W 52/28* (2009.01)
*H04W 52/02* (2009.01)
*H04W 72/04* (2009.01)
*H04N 1/00* (2006.01)
*H04W 72/00* (2009.01)
(Continued)

(52) U.S. Cl.
CPC .... *H04W 52/0216* (2013.01); *H04N 1/00896* (2013.01); *H04W 52/28* (2013.01); *H04W 72/048* (2013.01); *H04W 72/0446* (2013.01); *H04L 43/067* (2013.01); *H04L 69/22* (2013.01); *H04W 72/005* (2013.01)

(58) Field of Classification Search
CPC .............................. H04L 67/145; H04L 5/0055
See application file for complete search history.

(56) References Cited

U.S. PATENT DOCUMENTS

| | | |
|---|---|---|
| 10,187,905 B2 | 1/2019 | Chu et al. |
| 2012/0051312 A1 | 3/2012 | Noh et al. |

(Continued)

FOREIGN PATENT DOCUMENTS

| | | |
|---|---|---|
| WO | 2015031466 | 3/2015 |
| WO | 2015035945 | 3/2015 |
| WO | 2015081132 | 6/2015 |

OTHER PUBLICATIONS

"Notice of Allowance", U.S. Appl. No. 15/191,441, dated Sep. 12, 2018, 13 pages.

(Continued)

*Primary Examiner* — Salvador E Rivas

(57) ABSTRACT

The present disclosure describes methods and apparatuses for improved target wake time (TWT) operations in wireless networks. In some aspects, an access point transmits a trigger frame to stations of a TWT session during a TWT service period. Responsive to the trigger frame, the access point receives respective uplink frames transmitted by the stations. The access point then transmits a multi-block acknowledgment (M-BA) frame with a per association identifier traffic identifier (per AID TID) field configured to indicate whether one or more of the stations are permitted to enter a low-power state before an end of the TWT service period. By so doing, stations that are typically unable to interpret a more data field of the M-BA frame can determine based on the per AID TID if they are permitted to enter the low-power state and conserve power during a remainder of the TWT service period.

20 Claims, 16 Drawing Sheets

(51) Int. Cl.
*H04L 29/06* (2006.01)
*H04L 12/26* (2006.01)

(56) References Cited

U.S. PATENT DOCUMENTS

| | | | |
|---|---|---|---|
| 2014/0071873 A1 | 3/2014 | Wang et al. | |
| 2014/0112225 A1 | 4/2014 | Jafarian et al. | |
| 2015/0063190 A1 | 3/2015 | Merlin et al. | |
| 2015/0173012 A1 | 6/2015 | Seok | |
| 2016/0219510 A1* | 7/2016 | Asterjadhi | H04W 52/0212 |
| 2016/0380730 A1* | 12/2016 | Ghosh | H04W 24/10 |
| | | | 370/329 |
| 2016/0381704 A1 | 12/2016 | Chu et al. | |
| 2017/0230149 A1 | 8/2017 | Wang et al. | |
| 2017/0366321 A1* | 12/2017 | Kim | H04L 1/1671 |

OTHER PUBLICATIONS

"Amendment 6: Sub 1 GHz License Exempt Operation; Part 11: Wireless LAN Medium Access Control (MAC) and Physical Layer (PHY) Specification", IEEE P802.11ah™/D2.0; Draft Standard for Information Technology—Telecommunications and Information Exchange between Systems Local and Metropolitan Area Networks—Specific Requirements, Jun. 2014, 562 pages.

"Final Office Action", U.S. Appl. No. 15/191,441, dated Aug. 10, 2018, 15 pages.

"International Search Report and Written Opinion", PCT Application No. PCT/IB2016/053760, dated Nov. 18, 2016, 22 pages.

"Invitation to Pay Additional Fees", PCT Application No. PCT/IB2016/053760, dated Aug. 25, 2016, 8 pages.

"Non-Final Office Action", U.S. Appl. No. 15/191,441, dated Jan. 12, 2018, 19 pages.

"Pursuant to MPEP § 2001.6(b) the applicant brings the following co-pending application to the Examiner's attention: U.S. Appl. No. 15/191,441".

Chu, et al., "Basic Service Set Color Identifier", 2016, 39 pages.

Fischer, "LB200 Proposed Resolutions for Subclause 9.41", IEEE P802.11-14/0396r0, Dec. 27, 2013, 42 pages.

Khorov, et al., "A Survey on IEEE 802.11ah: An Enabling Networking Technology for Smart Cities", Computer Communications, vol. 58, Sep. 3, 2014, pp. 53-69.

Park, "IEEE P802.11 Wireless LANs", Proposed Specification Framework for TGah, Mar. 12, 2012, 13 pages.

Seok, "LB 200 Cluase (sp) 8 Miscellaneous Comment Resolution", IEEE P802.11 Wireless LANs; IEEE 802.11-14/0257r1, Feb. 26, 2014, 38 pages.

Wong, et al., "Proposed TGah Draft Amendment", IEEE 802.11-13/0500r0, May 9, 2013, 322 pages.

\* cited by examiner

| BO B5 | B6 B8 | B9 | B10 B19 | B20 | B21 | B22 B27 | B28 | B29 | B30 | B31 |
|---|---|---|---|---|---|---|---|---|---|---|
| BSS Color | Default PE Duration | TWT Required | HE Duration Based RTS Threshold | Partial BSS Color | VHT Operation Info Present | Reserved | Multiple BSSID AP | Tx BSSID Indicator | BSS Color Disabled | Scheduling PM Mode 604 |
| 6 | 3 | 1 | 10 | 1 | 1 | 6 | 1 | 1 | 1 | 1 |

High Efficiency (HE) Operation Element 600

METHODS AND APPARATUS FOR ALLOCATING PHYSICAL RESOURCES OF A WIRELESS NETWORK TO CLIENT DEVICES

CROSS REFERENCE TO RELATED APPLICATIONS

This present disclosure claims priority to U.S. Provisional Patent Application Ser. No. 62/572,313 filed Oct. 13, 2017, the disclosure of which is incorporated by reference herein in its entirety. This present disclosure is also related to U.S. patent application Ser. No. 15/191,441 filed Jun. 23, 2016, the disclosure of which is incorporated herein in its entirety.

BACKGROUND

Computing and electronic devices are often capable of wirelessly communicating with other devices or network controllers through which various resources are accessible. To do so, one of the devices is typically implemented as an access point to provide and manage a wireless network through which the other wireless devices are able to communicate as client devices. Generally, the access point manages the wireless network by assigning or allocating physical resources of the wireless network, such as portions of bandwidth and time, to enable efficient access to network resources and reduce contention for the physical resources. Based on a respective client device's allocation of physical resources, that client device can communicate with the access point using the client device's allocated bandwidth and time (e.g., channel and time slot).

When a client device is not communicating, such as outside a particular time slot assigned by the access point, the client device may set its wireless radio to a low-power state or enter a low-power state itself to conserve power. Each generation or type of device, however, may implement different versions of low-power states, implement different protocols for allocating communication time slots, or use different data frames to request additional data after waking from a low-power state. Accordingly, an access point may not be able to reliably allocate physical resources in such ways as to enable the client devices to enter low-power states or coordinate with the client devices to communicate before or after entering a low-power state. This in turn often results in a client device being prevented from entering the low-power state to conserve power, or results in reduced data throughput due to missing communicative time slots while in the low-power state.

SUMMARY

This summary is provided to introduce subject matter that is further described in the Detailed Description and Drawings. Accordingly, this Summary should not be considered to describe essential features nor used to limit the scope of the claimed subject matter.

In some aspects, a method is implemented by a target wake time (TWT) controller that transmits, from an access point, a trigger frame to stations of a TWT session during a TWT service period of the TWT session. The TWT controller then receives, at the access point, respective uplink frames from the stations in response to transmission of the trigger frame. The TWT controller then transmits a multi-block acknowledgment (M-BA) from the access point, the M-BA frame having a per association identifier traffic identifier (per AID TID) field configured to indicate whether one or more of the stations are permitted to enter a low-power state before an end of the TWT service period. The M-BA frame being effective to cause at least one of the stations to enter the low-power state before the end of the service period.

In other aspects, a System-on-Chip comprises a wireless communication controller and a TWT controller that is implemented at least partially in hardware. The TWT controller is configured to transmit, via the wireless communication controller, a trigger frame to stations of a TWT session during a TWT service period of the TWT session. The TWT controller then receives, via the wireless communication controller, respective uplink frames from the stations in response to transmission of the trigger frame. The TWT controller also transmits, via the wireless communication controller, a M-BA frame with a per AID TID field configured to indicate whether one or more of the stations are permitted to enter a low-power state before an end of the TWT service period. The M-BA frame being effective to cause at least one of the stations to enter the low-power state before the end of the service period.

In yet other aspects, a computer-readable storage media comprises instructions that, responsive to execution by a hardware-based processor, implement a TWT controller. The TWT controller transmits, via a wireless interface associated with the hardware-based processor, a trigger frame to stations of a TWT session during a TWT service period of the TWT session. The TWT controller then receives, via the wireless interface, respective uplink frames from the stations in response to transmission of the trigger frame. The TWT controller is also implemented to transmit, via the wireless interface, an M-BA frame with a per AID TID field configured to indicate whether one or more of the stations are permitted to enter a low-power state before an end of the TWT service period. The M-BA frame being effective to cause at least one of the stations to enter the low-power state before the end of the service period.

The details of one or more implementations are set forth in the accompanying drawings and the following description. Other features and advantages will be apparent from the description and drawings, and from the claims.

BRIEF DESCRIPTION OF THE DRAWINGS

The details of one or more implementations of methods and apparatuses for improved target wake time operations are set forth in the accompanying figures and the detailed description below. In the figures, the left-most digit of a reference number identifies the figure in which the reference number first appears. The use of the same reference numbers in different instances in the description and the figures indicates like elements:

FIG. 6 illustrates an example high efficiency operation element that includes a field enabling power save for an access point outside of a TWT service period.

DETAILED DESCRIPTION

Figure 1:
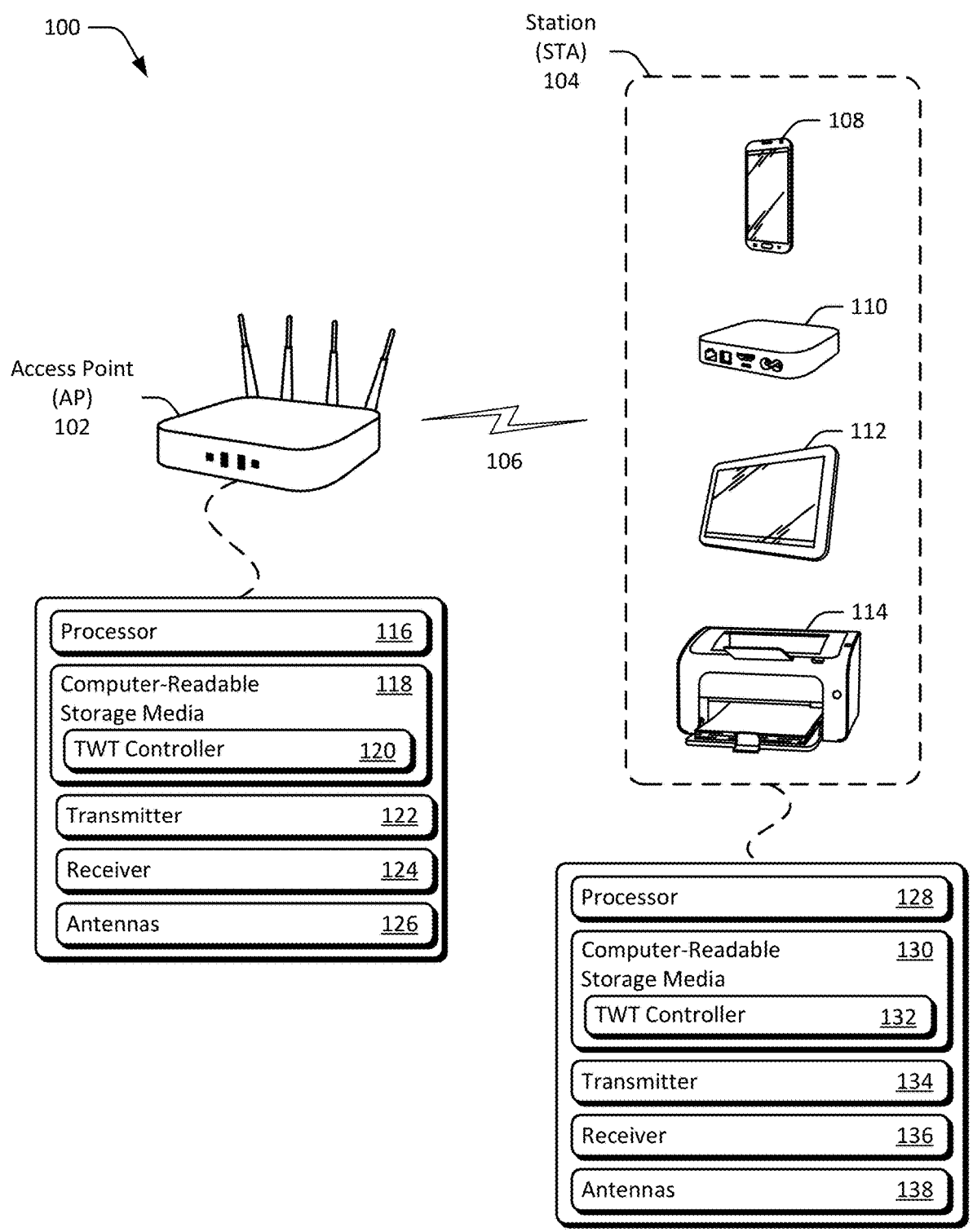
FIG. 1 illustrates an example operating environment that includes wireless devices implemented in accordance with one or more aspects.

Conventional techniques for coordinating a periodic or broadcast communication schedule for devices of a wireless network are often incompatible with different types of devices or unable to fully utilize respective power management functions of different generations of devices. For example, each generation or type of device may implement different versions of low-power states, implement different protocols for allocating communication time slots, or use different data frames to request additional data after waking from a low-power state. With respect to networks that implement target wake time (TWT) scheduling, these issues may include, but are not limited to early ending rules of service periods that are unable to handle uplink transmissions, incompatible block acknowledgments, TWT scheduling that prevents access points from sleeping, or action frames that are unable to handle teardown of specific beacons. As such, conventional or previous techniques for implementing TWT scheduling have many issues that can prevent wireless clients or access point from efficiently using service periods for sleeping or power conservation.

This disclosure describes apparatuses and techniques for improved target wake time operations in wireless networks. Generally, these apparatuses and techniques may use TWT elements, action frames, and/or various data fields of frames communicated between an access point and station devices to implement improved TWT operations. Aspects of improved TWT operations described herein include early ending of TWT service periods, enabling power save outside of TWT service periods (e.g., for access points), and target wakeup target beacon transmit time (TW_TBTT) teardown. Any or all of the aspects described herein can be implemented separately or in combination to provide improved TWT operations for wireless network.

In at least some aspects of improved TWT operations, an access point transmits a trigger frame to stations of a TWT session during a TWT service period. Responsive to the trigger frame, the access point receives respective uplink frames from the stations. The access point then transmits a multi-block acknowledgment (M-BA) frame with a per association identifier traffic identifier (per AID TID) field configured to indicate whether one or more of the stations are permitted to enter a low-power state before an end of the TWT service period. By so doing, stations that are typically unable to interpret a more data field of the M-BA frame can determine based on the per AID TID if they are permitted to enter the low-power state and conserve power during a remainder of the TWT service period. This and other aspects of improved TWT operations described throughout this disclosure may be implemented to enable early ending of TWT service periods, provide power saving outside of TWT service periods for access points, and/or TW_TBTT teardown.

The following discussion describes an operating environment, techniques that may be employed in the operating environment, and a System-on-Chip (SoC) in which components of the operating environment can be embodied. In the context of the present disclosure, reference is made to the operating environment by way of example only.

Operating Environment

FIG. 1 illustrates an example operating environment 100 that includes an example access point 102 and example station devices 104 (stations 104) in accordance with one or more aspects. Each of these devices may be wireless-network-enabled and capable of communicating data, packets, and/or frames over a wireless link 106. The wireless link 106 may include any suitable type of wireless communication link or wireless network connection. For example, the wireless link 106 may be implemented in whole or in part as a wireless local-area-network (WLAN), ad-hoc WLAN (e.g., a direct wireless link), wireless mesh network, near-field communication (NFC) link, wireless personal-area-network (WPAN), wireless wide-area-network (WWAN), or short-range wireless network. The wireless link 106 may be implemented in accordance with any suitable communication protocol or Institute of Electrical and Electronics Engineers (IEEE) standard, such as IEEE 802.11-2012, IEEE 802.11-2016, IEEE 802.11ac, IEEE 802.11ad, IEEE 802.11ah, IEEE 802.11ax, and the like.

In this example, the access point 102 is implemented to provide and manage a wireless network that includes the wireless link 106. The wireless link 106 may be implemented with any suitable modulation and coding scheme (MCS), such as orthogonal frequency division multiplexing access (OFDMA). In other cases, the access point 102 may include or be embodied as a host device, enhanced node base station, wireless router, broadband router, modem device, drone controller, vehicle-based network device, or other network administration node or device. The stations 104 of the example environment 100 include a smart-phone 108, set-top box 110, tablet computer 112, and wireless printer 114. Although not shown, other configurations of the stations 104 are also contemplated, such as a mobile station, laptop computer, medical device, security system, drone, camera, wearable smart-device, Internet-of-Things (IoT) device, gaming device, smart appliance, Internet-protocol enabled television (IP TV), personal media device, navigation device, mobile-internet device (MID), network-attached-storage (NAS) drive, mobile gaming console, and so on.

Generally, the access point 102 provides connectivity to the Internet, other networks, or network-resources through a backhaul link (not shown), which may be either wired or wireless (e.g., a T1 line, fiber optic link, broadband cable network, intranet, a wireless-wide-area network). The backhaul link may include or connect with data networks operated by an internet service provider, such as a digital subscriber line or broadband cable provider and may interface with the access point 102 via an appropriately configured modem (not shown). While associated with the wireless network provided by the access point 102 (e.g., via the wireless link 106), the smart-phone 108, set-top box 110, tablet computer 112, or wireless printer 114 may access the Internet, exchange data with each other, or access other networks for which access point 102 acts as a gateway.

The access point 102 includes a processor 116 configured to execute processor-executable instructions and computer-readable storage media 118 (CRM 118). In some cases, the processor 116 is implemented as an application processor (e.g., multicore processor), baseband processor, or part of a software-defined radio to manage operation and connectivity of the access point 102. Alternately or additionally, the processor 116 can be implemented as or with one or more processor cores, a microcontroller, or a digital signal processor (DSP) to execute instructions or process data. The CRM 118 of the access point 102 may include any suitable type and/or combination of storage media, such as read-only memory (ROM), random access memory (RAM), or Flash memory. In the context of the disclosure, the CRM 118 of the access point 102 is implemented as storage media, and thus does not include transitory signals or carrier waves. The CRM 118 may store firmware, an operating system, or applications of the access point 102 as instructions that are executed by the processor 116 to implement various functionalities of the access point 102. In this example, a target wake time controller 120 (TWT controller 120) is embodied on the CRM 118 of the access point 102. The TWT controller 120 may be stored as processor-executable instructions on the CRM 118, which are executed by the processor 116 to implement an instance of the TWT controller 120.

The TWT controller 120 of the access point 102 can be implemented to perform various functions associated with establishing, scheduling, or managing aspects of one or more TWT sessions with respective intervals. In some aspects, the TWT controller 120 implements aspects of improved target wake time operations, such as early ending of service periods, power save modes outside of service periods, high efficiency power management modes, or target transmit beacon target time teardown. The implementations and uses of the TWT controller 120 vary and are described throughout the disclosure.

The access point 102 also includes a transmitter 122, receiver 124, and antennas 126 for providing a wireless network, communicating with the stations 104, or communicating other wirelessly-enabled devices. The transmitter 122 or receiver 124 may include any suitable number of respective communication paths (e.g., transmit or receive chains) to support transmission or reception of multiple spatial streams of data. Functionalities of the transmitter 122 and/or receiver 124 may be managed or accessible through a communications controller or baseband processor, which may be implemented with or separately from a TWT controller 120. Although not shown, radio frequency (RF) front-end circuitry of the access point 102 can couple or connect the transmitter 122 or receiver 124 to the antennas 126 to facilitate various types of wireless communication. The antennas 126 of the access point 102 may include an array of multiple antennas that are configured similar to or differently from each other.

Each of stations 104 includes a processor 128 and computer-readable storage media 130 (CRM 130). The processor 128 can be any suitable type of processor, either single-core or multi-core, for executing instructions or code associated with applications, firmware, or an operating system of the station 104. The CRM 130 may include any type and/or combination of suitable storage media, such as RAM, non-volatile RAM (NVRAM), ROM, or Flash memory useful to store data of applications and/or an operating system of the station 104. In the context of the disclosure, the CRM 130 is implemented as storage media, and thus does not include transitory signals or carrier waves. In this example, another instance of a target wake time controller 132 (TWT controller 132) is embodied on the CRM 130 of the station 104.

The TWT controller 132 of each station 104 may be implemented similar to or differently from the TWT controller 120 of the access point 102, and can perform various functions associated with establishing, scheduling, or managing aspects of one or more TWT sessions with respective intervals. In some aspects, the TWT controller 132 implements techniques of improved target wake time operations, such as early ending of service periods, power save modes outside of service periods, high efficiency power management modes, or target transmit beacon target time teardown. The implementations and uses of the TWT controller 132 vary and are described throughout the disclosure.

Each of the stations 104 also includes a transmitter 134, receiver 136, and antennas 138 for communicating with the access point 102 or other wirelessly-enabled devices. Although shown as separate entities, the transmitter 134 and receiver 136 may be implemented in combination as a transceiver component that supports both transmit and receive functionalities. The transmitter 134 or receiver 136 may include any suitable number of respective communication paths (e.g., transmit or receive chains) to support transmission or reception of multiple spatial streams of data. Functionalities of the transmitter 134 and/or receiver 136 may be managed or accessible through a communications controller or baseband processor, which may be implemented with or separately from a TWT controller 132. Front-end circuitry (not shown) of the station 104 may couple or connect the transmitter 134 or receiver 136 to the antennas 138 to facilitate various types of wireless communication. The antennas 138 may include an array of multiple antennas that are configured similar to or differently from each other.

Figure 2:
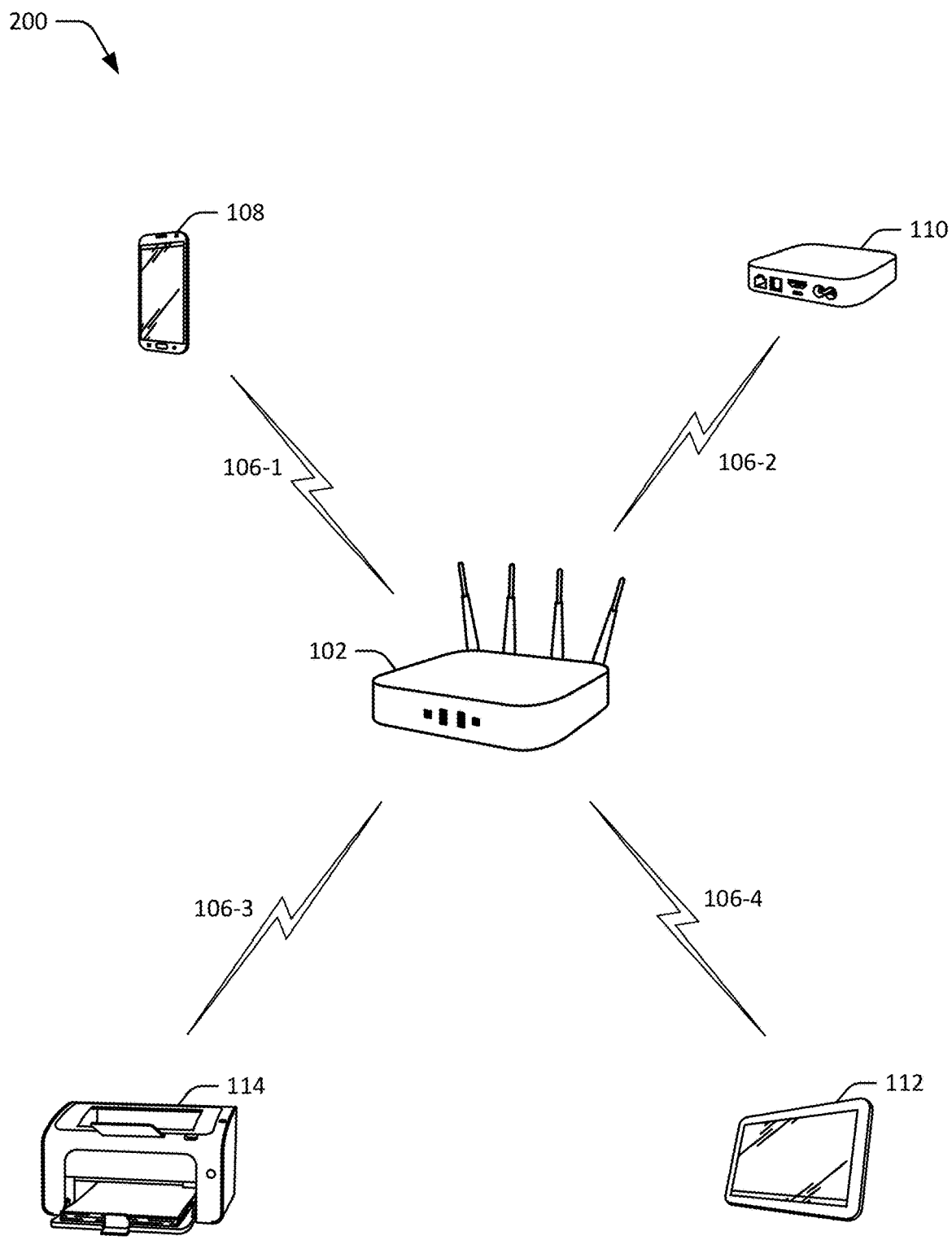
FIG. 2 illustrates an example wireless network in which devices of FIG. 1 may communicate during individual or broadcast TWT service sessions.

FIG. 2 illustrates an example wireless network 200 in which devices of the example environment 100 can implement TWT sessions and aspects of improved TWT operations. In this example, the access point 102 is serving or managing multiple stations 104 that are part of a basic service set (BSS) of the wireless network 200. The stations include the smart-phone 108, set-top box 110, tablet computer 112, and wireless printer 114, each of which may be configured or function as described herein. The access point 102 may exchange, transmit, or receive various packets and frames with any or all of the stations 104 though respective instances of a wireless link 106-1 through 106-4. In the context of a wireless local area network, such as one implemented in accordance with various IEEE 802.11 standards, the access point 102 can transmit or receive management frames, control frames, or data frames with one or more of the stations 104.

Each of the wireless links 106 between the access point 102 and clients 104 may include or facilitate an exchange of uplink (UL) and downlink (DL) frames between the devices. An exchange of UL frames and DL frames described herein may include transmission and/or reception of only UL frames, only DL frames, or both UL frames and DL frames. In some cases, the access point 102 solicits transmission of data from the stations 104 through use of a trigger frame, which may enable a frame exchange between the access point 102 and one or more of the stations 104. The access point 102 and/or the stations 104 may schedule or coordinate frame exchanges to occur during periodic, implied, or asynchronous durations of time during which the access point 102 and stations 104 are active or in a non-sleep state. Conversely, in some aspects, the access point 102 and/or ones of the stations 104 may enter low-power or sleep states to conserve power when not performing or expected to participate in a frame exchange with another device.

Figure 3:
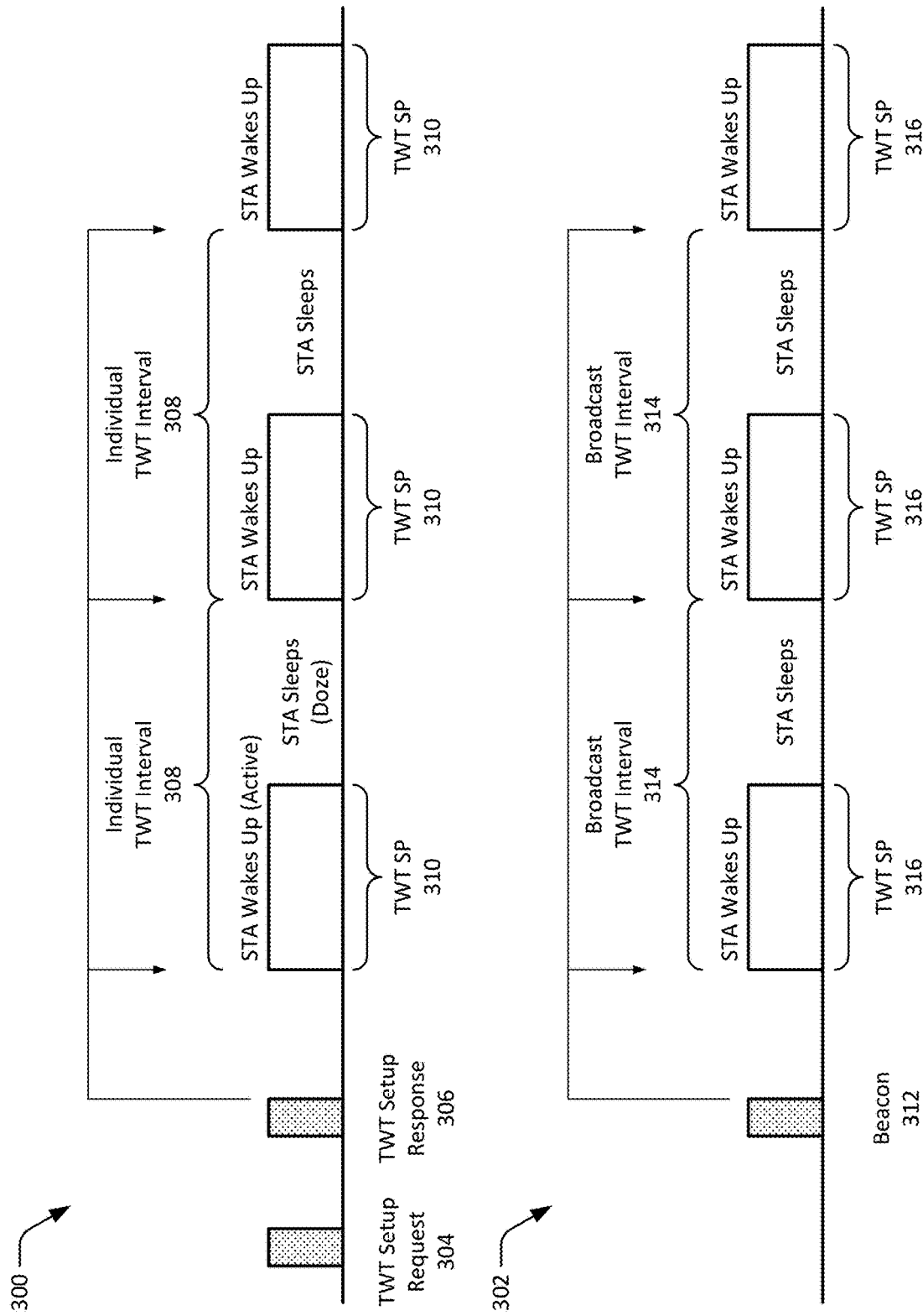
FIG. 3 illustrates an example timeline of an individual TWT session and an example timeline for a broadcast TWT session.

By way of example, consider FIG. 3 which illustrates an example timeline of an individual target wake time (TWT) session at 300 and an example timeline for a broadcast TWT session at 302. Generally, a TWT scheduling protocol can be implemented to schedule when the access point 102 or ones of the stations 104 are (i) active to perform frame exchanges (or other communications), and (ii) inactive to conserve power or perform other non-communication operations. These times may be predetermined, such as by the TWT controller 120 of the access point 102 or be negotiated between the access point 102 and one or more of the stations 104. Alternately or additionally, a device scheduled in accordance with a TWT session may communicate via another wireless interface (e.g., BlueTooth or cellular) outside of an TWT service period.

With respect to the individual TWT session 300, this TWT session may be negotiated between two of the devices, such as the access point 102 and an individual one of the stations 104. The access point 102 and station 104 can negotiate a TWT via a TWT information element that includes requisite information and parameters for scheduling one or more TWT service periods during which the station 104 can wake to communicate with the access point 102. During this negotiation process or TWT setup phase, one of the devices requesting to establish the TWT session may be referred to as a TWT requestor and another of the devices that responds to the TWT requests may be referred to as a TWT responder. Here, assume in the context of a TWT setup phase that the station 104 is acting as a TWT requestor and the access point 104 is acting as a TWT responder.

Returning to FIG. 3, the station 104 transmits a TWT request 304 to the access point 102, which responds to the TWT request 304 by transmitting a TWT setup response 306 back to the station 104. Although one exchange is shown, the access point 102 and station 104 may perform multiple exchanges of frames to renegotiate or revise TWT schedules through individually addressed frames that include TWT information or parameters for the individual TWT session. These negotiations or TWT setup phase conclude with the establishment of the individual TWT session 300, which include individual TWT intervals 308 and TWT service periods (SPs) 310 (or TWT service period durations 310).

As indicated in FIG. 3, one or more of the stations 104 can wake (active) during their respective individual TWT SP 310 to communicate with the access point 102 and then enter a sleep state (doze) responsive to the end of the TWT SP 310. In some cases, the access point 102 can enter a sleep state if the stations 104 associated with the access point 102 support TWT requester features, and the access point 102 forces the stations 104 to join the individual TWT SP 310. For example, a station 104 may be configured or act as a TWT requester to initiate a TWT session, such as by transmitting a TWT element with a TWT request field (requesting a TWT), TWT values, TWT parameters, or other information to facilitate scheduling or setup of a TWT session (e.g., TWT and group IDs). Alternately or additionally, the TWT scheduled stations 104 can negotiate or re-negotiate target wakeup target beacon transmission times (TBTT) with the TWT scheduling access point 102, which can transmit beacons or trigger frames to solicit frame exchanges with the stations 104. To alter or end a TWT session 300 or 302, a TWT teardown frame (not shown) can be used by the access point 102 (or stations 104) to teardown a target wakeup TBTT or to teardown a one or more TWT SPs 310.

During the TWT SPs 310, the access point 102 and ones of the client 104 can implement or perform any suitable type of frame exchange. For example, one or more of the stations 104 can perform an uplink frame transmission, such as an uplink multi-user (UL MU) exchange with the access point 102. In some cases, the access point 102 can solicit the UL MU frame exchange by transmitting a beacon or trigger frame. Alternately or additionally, the access point 102 can perform a downlink transmission, such as a downlink single-user (DL SU) to one station 104 or downlink multi-user (DL MU) transmission in which multiple stations 104 receive data transmitted by the access point 102. After one or more of these frame exchanges, one or more of the stations 104 may enter a sleep state for a remainder of the TWT SP 310 for which they awoke.

With respect to the broadcast TWT session 302, the access point 102 may determine and broadcast a TWT schedule to one or more of the stations 104. In contrast to one or more of the individual TWT sessions 300, parameters of the broadcast TWT session 302 may not be negotiated between the devices of the wireless network 200. In some implementations, the access point 102 broadcasts a TWT schedule via beacon 312 to one or more of the stations, which may accept and/or agree to join the broadcast TWT session 302 established by the TWT schedule. Based on the beacon 312, the TWT schedule proposed by the access point 102 establishes or defines broadcast TWT intervals 314, which include TWT service periods (SPs) 316 (or TWT service period durations 316).

Similar to the individual TWT session 300, one or more of the stations 104 can wake (active) during one of the broadcast TWT SPs 316 to communicate with the access point 102 and then enter a sleep state (doze) responsive to the end of the TWT SP 316. In some cases, the access point 102 can enter a sleep state if all the stations 104 associated with the access point 102 have joined the broadcast TWT session 302, such that the access point 102 does not need to remain awake to support other individual TWT sessions 300. During the TWT SPs 316 of the broadcast TWT session 302, the access point 102 and ones of the client 104 can implement or perform any suitable type of frame exchange. For example, one or more of the stations 104 can perform an uplink frame transmission, such as an uplink multi-user (UL MU) exchange with the access point 102. In some cases, the access point 102 can solicit the UL MU frame exchange by transmitting a beacon or trigger frame. Alternately or additionally, the access point 102 can perform a downlink transmission, such as a DL SU or DL MU as described herein. After one or more of these frame exchanges, one or more of the stations 104 (or the access point 102) may enter a sleep state for a remainder of the TWT SP 316 for which they awoke.

Early Ending of TWT Service Periods

Figure 4:
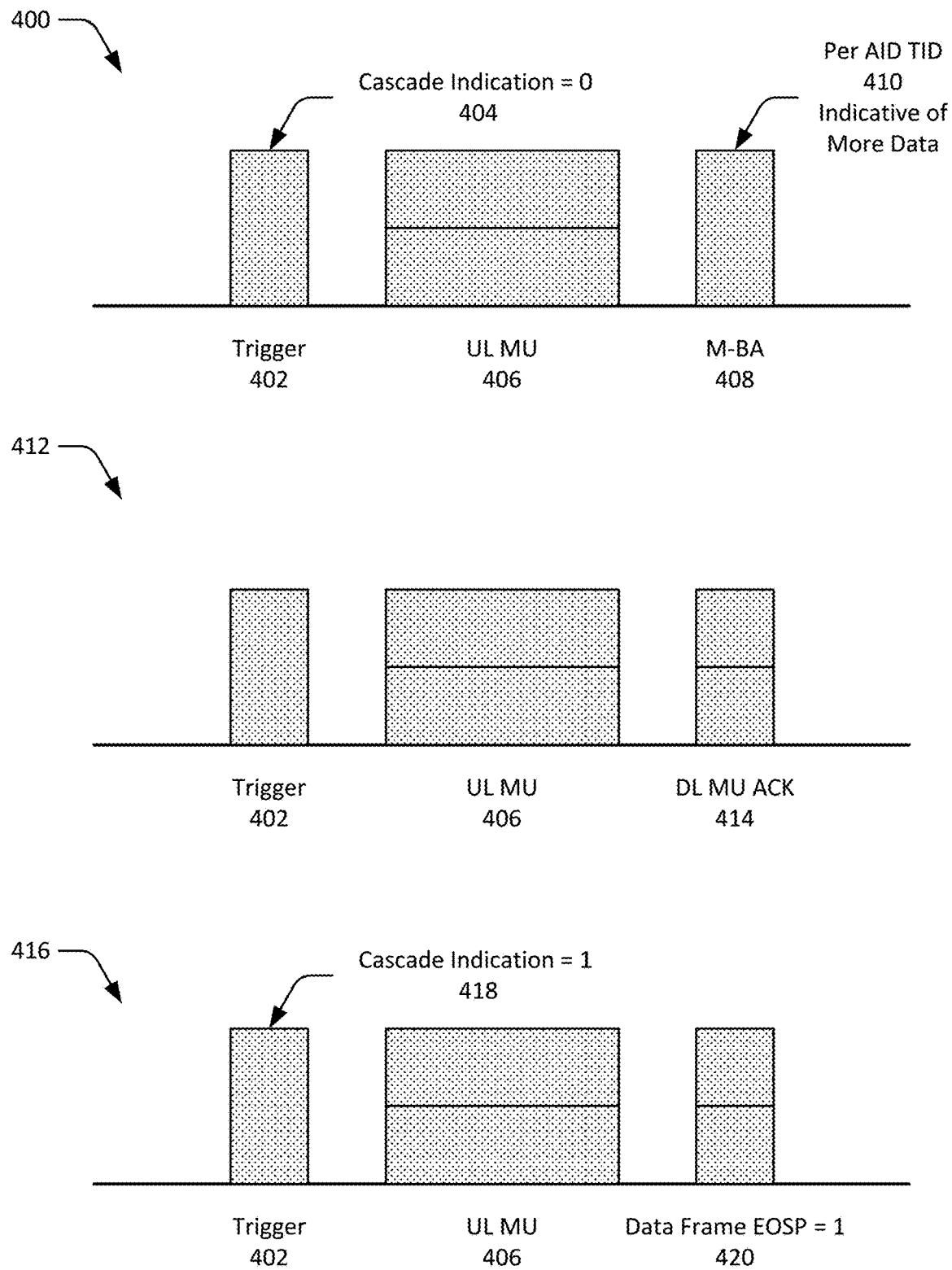
FIG. 4 illustrates examples of various frame exchanges during a TWT session through which an early ending of a TWT service period can be managed.

FIG. 4 illustrates examples of various frame exchanges during a TWT session through which an early ending of a TWT service period can be managed. As noted, some stations 104 may enter a sleep state or low-power state before an end of a TWT service period. For example, when a trigger frame of a frame exchange that has a cascade field set to zero is destined to one or more of the stations 104, the stations can enter a sleep or doze state after the frame exchange. In such cases, one or more of the stations 104 may be configured to sleep or doze based on a "more data" field of a control frame, such as a multi-block acknowledgement (M-BA). Some stations of a TWT session, however, may not support the "more data" field or indication, which can result in the more data field being incorrectly interpreted or misused by those stations.

Generally, the access point 102 may respond to one or more uplink transmissions of a frame exchange (e.g., UL MU) by transmitting an M-BA to the stations 104 to acknowledge reception of the uplink transmissions. For some stations 104, however, conventional ways for ending a TWT WP early that rely on the more data field may not work with a broadcast M-BA. Specifically, this issue may arise in a wireless network of mixed or heterogenous devices with different configurations, capabilities, protocol support, or the like. For example, if the acknowledgement (e.g., M-BA) of a UL MU is destined to multiple stations 104 and some stations support the more data indication and some stations do not support the more data indication, the broadcast acknowledgement can provide incorrect information because the more data field is typically set to zero (instead of one).

In aspects of improved TWT operations, a TWT controller 120 of an access point and/or a TWT controller 132 of a station 104 can implement an early ending of a TWT service period that does not rely on the "more data" field or indication of a multi-block acknowledgement (M-BA). By way of example, consider a UL MU frame exchange 400 of FIG. 4 that is implemented in accordance with one or more aspects of improved TWT operations as described herein. Here, an access point broadcasts at trigger frame 402 to solicit or trigger uplink transmissions from one or more of the stations 104. In the context of this example, assume that a cascade indication 404 of this trigger frame 402 is set to zero. Responsive to the trigger frame 402, the one or more stations 104 transmit UL MU frames 406 to the access point 102 during the TWT service period.

In contrast with conventional use of the more data field of the M-BA, in aspects of improved TWT operations the access point 102 broadcasts an M-BA 408 in which a per association identifier traffic identifier field 410 (per AID TID 410) indicates whether more data will be sent to the station 104. In other words, the per AID TID field 410 of the M-BA 408 indicates that more data is buffered or destined for the station 104 during the TWT service period such that the station 104 does not enter a doze state (stays awake) to receive additional data or dozes if there is no more data to receive. In some cases, a reserved bit in the Per AID TID field 410 indicates or provides functionality of a more data field for the station 104 identified in or by the AID in Per AID TID field 410. In other cases, a reserved bit in Per AID TID field 410 indicates whether a more data field of an M-BA in a media access control (MAC) header is to be used by the station 104. Thus, the reserved bit of the per AID TID field 410 may be used by one or more of the stations 104 to determine whether a TWT service period is ending early for that station or if the station 104 needs to remain awake to perform a subsequent frame exchange during the TWT service period.

In some aspect of improved TWT operations, a broadcast M-BA is not used as an acknowledgement to the uplink frame exchange. For example, consider a UL MU frame exchange 412 in which an access point 102 transmits a trigger frame 402 to solicit one or more of the stations to transmit UL MU frames 406. Here, instead of acknowledging the UL MU frames 406 with a M-BA, the access point 102 transmits a downlink multi-user acknowledgement 414 (DL MU ACK 414) as an acknowledgement. The access point 102 can transmit the DL MU ACK 414 with unicast resource units (RU) to the one or more stations 104 that transmitted uplink frames. A more data field of the DL MU ACK 414 may be used by the one or more stations 104 to determine whether a TWT service period is ending early for that station or if the station 104 needs to remain awake to perform a subsequent frame exchange during the TWT service period.

Alternately or additionally, some aspects of improved TWT operations may use a cascade indication or an end of service period indication by which a station 104 can determine an early ending for a TWT service period. By way of example, consider a UL MU frame exchange 416 that illustrates these aspects, which may be implemented separately, in combination, and/or in combination with other aspects described herein. Here, an access point 102 sets a cascade indication 418 of the trigger frame 402 to one, thereby indicating that a subsequent frame exchange will occur after the UL MU 406 is performed. Also shown in FIG. 4 is the use of an end of service period (EOSP) indication 420, which may be transmitted as part of a data frame to one or more of the stations 104 to acknowledge the UL MU 406. In some cases, the EOSP is sent as part of a QoS null data frame, which often requires less processing overhead than a management frame. Thus, in some aspects of improved TWT operations, one or more of the stations 104 may rely on the EOSP indication 420 before ending a TWT service period early to prematurely enter the doze state. As such, various aspects of improved TWT operations provide multiple ways to address early endings of TWT service periods with respect for frame exchanges, such as UL MU exchanges during a TWT service period.

Another issue that may arise in association with use of M-BAs are related to reception of an M-BA by a station during an announced TWT SP. For example, the station may need to implement an acknowledgement type (ACK type) set to one and a traffic indicator (TID) set to 15 to enable decoding a power save poll (PS-Poll) acknowledgement in the M-BA. In some cases, however, an amount of resources allocated by a trigger frame transmitted by an access point is sufficient to enable transmission of only the PS-Poll control frame by the station.

In some aspects of improved TWT operations, implementation of a station (or station's response protocol) can be altered or simplified by allocating enough resources for the station to transmit a quality-of-service null (QoS Null) data frame. For example, in an announced TWT service period, a basic trigger frame of an access point 102 that polls one or more of the stations' 104 readiness may always allocate enough resources for the one or more stations 104 to transmit a QoS Null frame (e.g., data frame). For example, a TID aggregation limit field in the basic trigger frame of the announced TWT service period can control whether the station needs to transmit an acknowledgement (ACK) to acknowledge the QoS Null frame. In some cases, when the TID aggregation limit field is set to zero, the QoS Null frame will not be used to solicit or ask for acknowledgement from the access point. In other cases, the TID aggregation limit field is set to one, the QoS Null frame will ask or solicit for acknowledgement from the access point. Note that any of these aspects may be implemented for any frame communication and are not necessarily limited to a TWT service period or session.

Service periods involving downlink multi-user (DL MU) frame exchanges may also be managed through aspects of improved TWT operations. In some case, issues arise with conventional early ending rules when a TWT service period includes an UL MU frame exchange that occurs after a DL MU frame exchange. For example, the conventional early ending rules dictate that when receiving a DL MU protocol data unit (PPDU) or DL single-user (SU) PPDU, if an access point transmits all frames buffered destined to a station, which do not include an EOSP, the more data field is set to zero and that station may enter a doze state after receiving the frames. When this occurs, the sleeping stations can miss subsequent trigger frames transmitted by the access point in the TWT service period to solicit UL MU transmissions.

Figure 5:
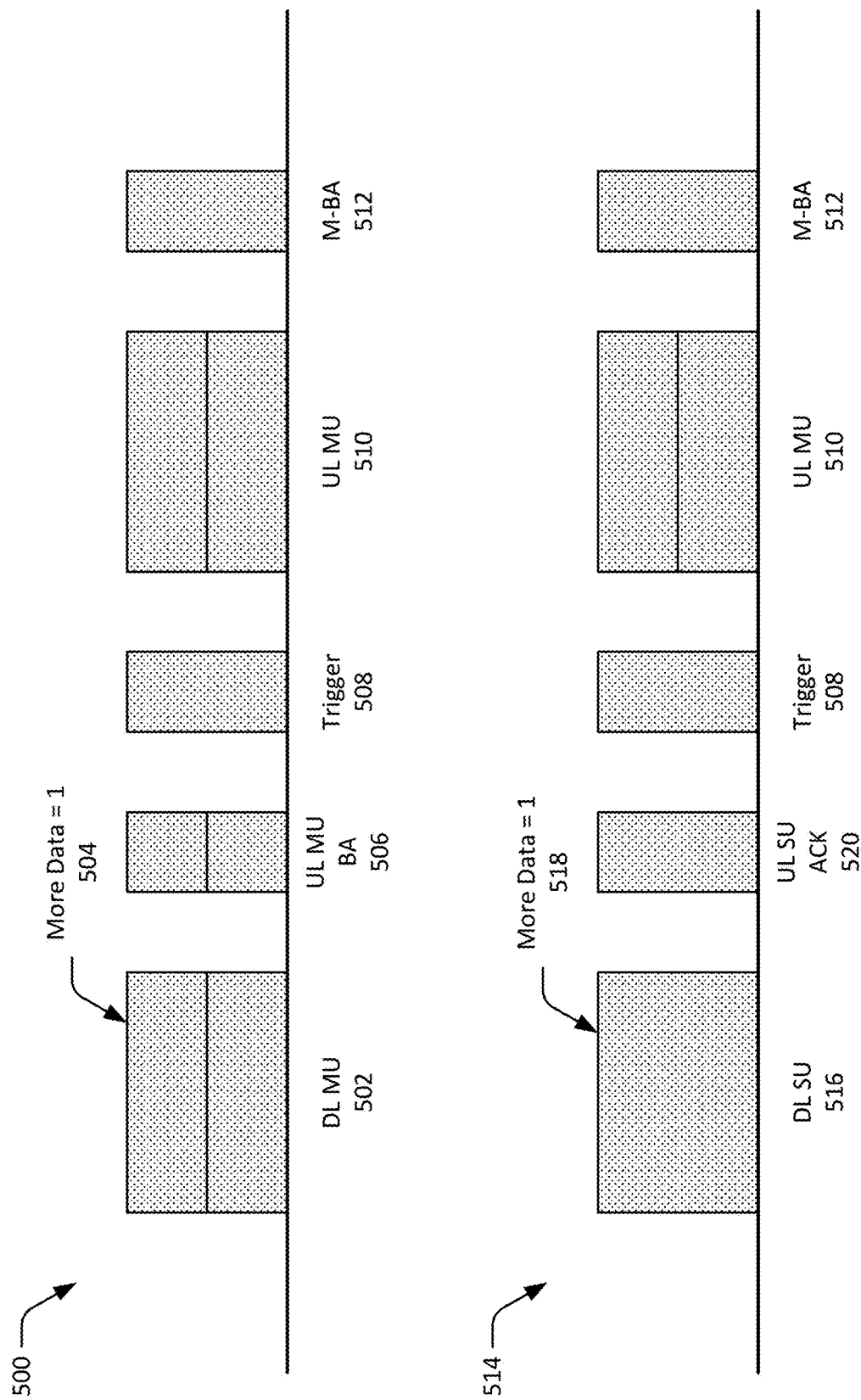
FIG. 5 illustrates examples of various frame exchanges during a TWT session in which a station is enabled to participate in an uplink multi-user (UL MU) transaction solicited by an access point.

FIG. 5 illustrates examples of various frame exchanges during a TWT session in which a station is enabled to participate in an uplink multi-user transaction solicited by an access point. FIG. 5 includes a DL MU frame exchange 500 that is implemented during a TWT session in accordance with one or more aspects of improved TWT operations as described herein. Here, an access point 102 transmits DL MU frames 502 to two or more of the stations 104 with a more data field 504 of one or more of the DL MU frames 502 set to one (More Data=1). This can be effective to prevent the one or more stations 104 of the TWT session from entering a doze state after receiving the DL MU frames 504 and/or after transmitting an uplink multi-user block acknowledgement 508. By keeping the stations wake after the DL MU frame exchange, the stations 104 are able to then participate in a subsequent UL MU frame exchange that includes a trigger frame 508, UL MU frames 510, and M-BA 512 (or another type frame as described herein).

In some cases, an access point 102 sets the more data field to one (More Data=1) in frames of a DL MU PPDU, such as in one of the DL MU frames 502, based on a predefined set of conditions or criteria. For example, the access point 102 can set the more data field to one in one or more frames of the DL MU PPDU if the access point 102 transmits or sends to a station 104 all of its buffered frames, which don't include EOSP fields, and the access point 102 will send a trigger frame (e.g., trigger frame 508) to the station 104 during the TWT service period. Based on reception of the DL MU PPDU, additional rules or parameters may also be implemented at a receiving station. For example, the station may stay awake (or not sleep for the remainder of the TWT SP) if the station receives frames in the DL MU PPDU that do not include an EOSP field addressed to the station, do not include more data fields set to zero, and a cascade subfield of a trigger frame in the DL MU PPDU is set to one. Thus, even though the more data field of frames in the DL MU PPDU are set to zero, the station may stay awake after the DL MU frame exchange to participate in a UL MU frame exchange later solicited by the access point.

Aspects of improved TWT operations can also be implemented with respect to a DL SU frame exchange, such as DL SU frame exchange 514 that is implemented during a TWT session. In this example, an access point 102 transmits DL SU frames 516 to a station 104 with a more data field 518 of one or more of the DL SU frames 516 set to one (More Data=1). This can be effective to prevent the station 104 of the TWT session from entering a doze state after receiving the DL SU frames 516 and/or after transmitting an uplink single-user acknowledgement 520. By keeping the station awake, the station 104 is then able to participate in a subsequent UL MU frame exchange that includes the trigger frame 508, UL MU frames 510, and M-BA 512 (or another type frame as described herein). In some cases, an access point 102 sets the more data field to one (More Data=1) in frames of a DL SU PPDU, such as in one of the DL SU frames 516, based on a predefined set of conditions or criteria. For example, the access point 102 can set the more data field to one in one or more frames of the DL SU PPDU if the access point 102 transmits or sends to a station 104 all of its buffered frames, which don't include EOSP fields, and the access point 102 will send a trigger frame (e.g., trigger frame 508) to the station 104 during the TWT service period.

Enabling Power Save States Outside of TWT Service Periods

FIG. 6 illustrates a high efficiency (HE) operation element 600 that includes a field or indication enabling power save features of an access point. Generally, an access point can control respective operations of HE-enabled stations through the use of a high-throughput (HT) operation element, very-high-throughput (VHT) operation element, or the HE operation element 600. The HE operation element 600 includes multiple fields or subfields that are assigned or allocated to bits 602 or bit positions of the HE operation element. Here, a scheduling power management (PM) mode bit 604 is shown at a thirty-first-bit position (B31), though aspects of improved TWT operations can be implemented by using another bit of the HE operation element 600, such as one of the reserved bits (e.g., B22-B27).

As shown in FIG. 6, the other fields or subfields of the HE operation element 600 may include a BSS color field that corresponds to a transmitting access point, a default packet extension (PE) duration field, TWT required field, and an HE duration-based request-to-send (RTS) threshold field. Further, the HE operation element 600 can have a partial BSS color field, a VHT operation information present field, a reserved field, and a multiple BSS identification (BSSID) indicator field. In some cases, the HE operation element 600 also includes a transmit BSSID indicator field and a BSS color disabled field, which can be used to indicate whether a BSS applies an AID assignment rule using partial BSS color bits.

As described herein, issues can arise when TWT scheduled stations associate with an access point, which may prevent the access point from entering a sleep state or doze state outside of those scheduled TWT service periods. In contrast with a conventional HE operation element, in aspects of improved TWT operations an HE operation element 600, or other management frame, includes a one-bit field or subfield for enabling power management of the access point. Here, the scheduling PM mode bit 604 is shown as being added or inserted at bit 31 of the HE operation element 600, although this bit may be inserted anywhere within an HE operation element or other management frame.

Generally, the scheduling PM mode bit 604 is used by an access point to indicate stations participating in a TWT session (or attempting to do so), that the access point will enter a sleep or low-power state outside of a TWT session. In some cases, the TWT session is a broadcast TWT session, such that the access point can inform the stations to join the broadcast TWT session and use the service periods of that TWT session (instead of other individual TWT sessions). For example, when all stations that are associated with the TWT scheduling access point support broadcast TWT sessions and the TWT required field is set to one in the HE operation element 600, the access point can enter a sleep state outside of the broadcast TWT service periods. As another example, consider access point that supports TWT scheduling of both individual TWT sessions and broadcast TWT sessions. In such a case, the access point can enter a sleep state outside of the individual TWT service periods and the broadcast TWT service periods is each station associated with the access point is one or both of a TWT requestor and a TWT scheduled station. Alternately or additionally, the TWT required field of the broadcasted HE operation element 600 can be set to one by the access point in some implementations.

Target Wakeup Target Beacon Transmit Time Teardown

Figure 7:
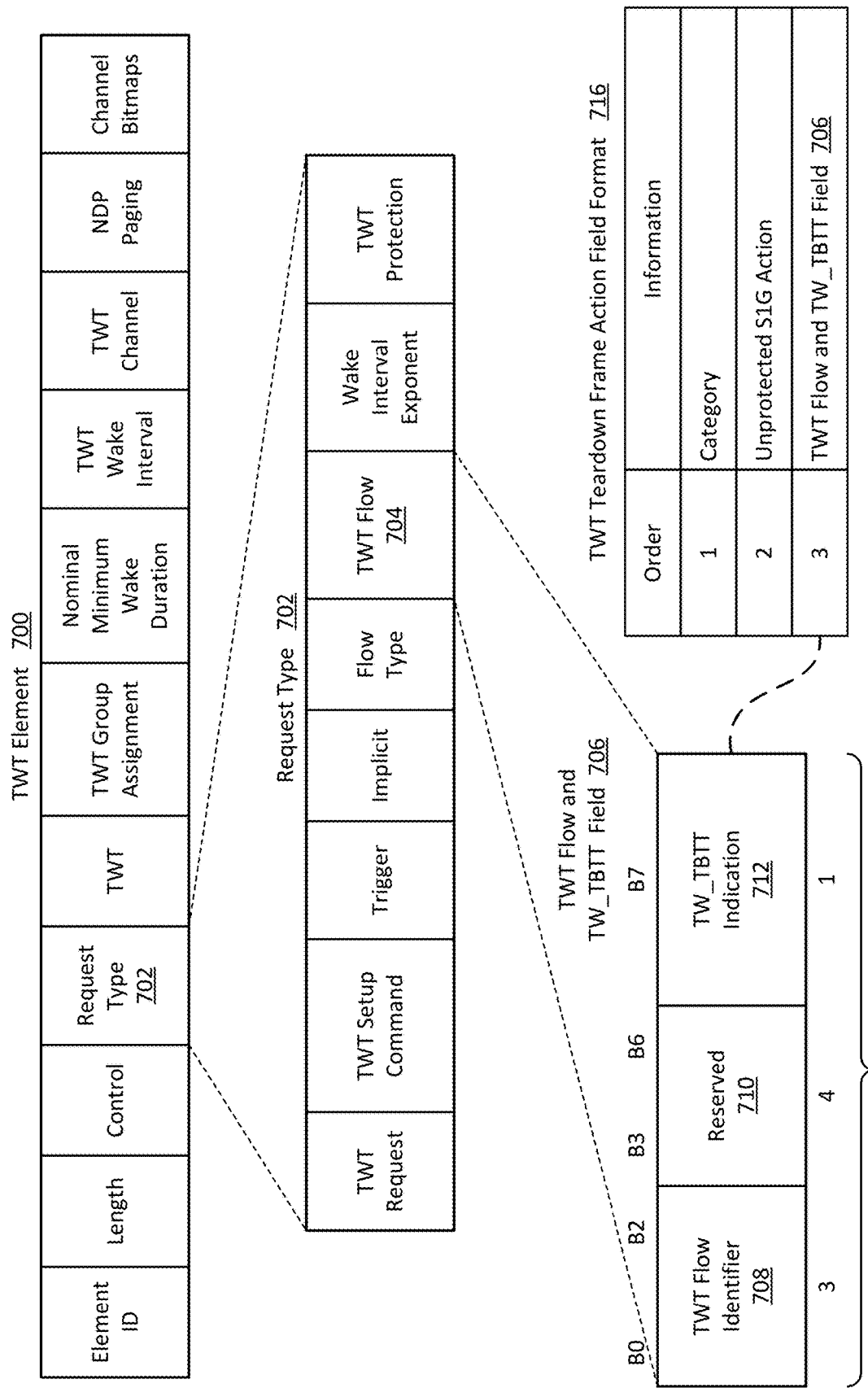
FIG. 7 illustrates an example flow type field of a TWT element capable of implementing teardown a target wakeup target beacon transmission time (TW_TBTT) and/or an individual TWT service period.

FIG. 7 illustrates an example flow type field of a TWT element 700 for implementing teardown of a target wakeup target beacon transmission time (TBTT) or an individual TWT service period. As described herein, in some cases a conventional TWT teardown frame cannot be used to teardown a target wakeup TBTT of a station, such as one of stations 104. Specifically, the conventional TWT teardown frame is unable to cause the station to teardown the target wakeup TBTT when the station has or is configured with individual TWT service periods and a target wake TBTT. In aspects of improved TWT operations, a TWT flow field of at TWT element includes a bit configured to indicate whether the frame is to be used to teardown an individual TWT service period or a target wakeup TBTT.

By way of example, consider the TWT element 700 of FIG. 7, which is implemented in accordance with one or more aspects of improved TWT operations. Generally, the TWT element 700 includes various fields for indicating an information element as a TWT element and parameters for establishing or managing aspects of a TWT session. In this example, the TWT element includes an element ID to identify the information element as a TWT element and a length field to indicate a length of the TWT element 700, such as from the following control field to the termination of the TWT element 700 (e.g., channel bitmaps field). The TWT element also 700 includes a control field and request type field 702, which is described in more detail with respect to a TWT flow field 704. In various implementations, the TWT element 700 also includes a target wake time (TWT) field, a TWT group assignment field, a nominal minimal wake duration field, a TWT wake interval, a TWT channel field, a null data packet (NDP) page field, or a channel bitmaps field for OFDMA channel mapping. Alternately or additionally, the length field or another field of the TWT element 700 may indicate that the TWT element includes multiple instances of any or all of these fields. In such cases, the TWT element 700 may include parameters or information fields for multiple TWT negotiations or indications, each of which is identifiable based on a flow control field 704 of the request type field 702.

The request type field 702 of the TWT element 700, which can indicate a type of a TWT request, may also include other fields or subfields associated with a TWT request or other TWT communication. In some cases, these fields or subfields include a TWT request field, a TWT setup command field, a trigger field, an implicit field, a flow type, a TWT flow field 704, a wake interval exponent, or a TWT protection field. As shown in FIG. 7, in aspects of improved TWT operations the TWT flow field 704 is implemented as a TWT flow and target wakeup TBTT (TW_TBTT) field 706. The TWT flow and TW_TBTT field 706 is capable of indicating whether a frame or TWT element 700 is to be used to teardown an individual TWT service period or a target wakeup TBTT. In this example implementation, the TWT flow and TW_TBTT field 706 includes a TWT flow identifier field 708, a reserved field 710, and a TW_TBTT indication 712, which occupy respective bits 714 of the TWT flow and TW_TBTT field 706 as shown in FIG. 7. Here, note that the bit assignments or allocations are shown by way of example only, and a TW_TBTT indication 712 may be allocated to, or represented by, any bit in a TWT flow field 704 or the TWT flow and TW_TBTT field 706.

In some aspects, TWT flow and TW_TBTT field 706 is only transmitted to stations 104 that support target wakeup TBTT negation. For example, an access point may query a station to determine if the station supports target wakeup TBTT or maintain a list of stations that support target wakeup TBTT. Generally, the TWT flow and TW_TBTT field 706 can be used to indicate whether the frame or TWT element 700 is to be used to teardown an individual TWT service period or a target wakeup TBTT of a station. In some cases, when an access point sets a value of the TW_TBTT indication 712 to 1, TWT Flow Identifier 708 is ignored (or disregarded) and the TWT teardown frame is used by the station to teardown a target wakeup TBTT of the station. Alternately, when an access point sets the TW_TBTT indication 712 is 1, the TWT teardown is used by the station to teardown an individual TWT service period identified by TWT flow identifier 708. With respect to a TWT teardown frame action field format 716 and as shown in FIG. 7, the TWT flow and TW_TBTT field 706 can be implemented as a third field in an order of the frame action field, following category information and unprotected S1G action information of the frame.

Techniques of Improved Target Wake Time Operations

The following discussion describes techniques of improved target wake time operations for wireless networks. These techniques can be implemented using any of the environments and entities described herein, such as a TWT controller 120, transmitter 122, and receiver 124 of an access point 102. Alternately or additionally, the techniques can be implemented by or in combination with a TWT controller 132, transmitter 134, and receiver 136 of a station 104. These techniques include methods that are illustrated in FIGS. 8-15, each of which is shown as a set of operations performed by one or more entities.

The illustrated methods are not necessarily limited to the orders or combinations of operations shown in the Figures. Rather, any of the operations may be repeated, omitted, substituted, or re-ordered to implement various aspects described herein. Further, these methods may be used in conjunction with one another, in whole or in part, whether performed by the same entity, separate entities, or any combination of the entities. In portions of the following discussion, reference will be made to the operating environment 100 of FIG. 1 and the wireless network of FIG. 2 by way of example. Such reference is not intended to be limiting any of the described aspects to the operating environment 100 or wireless network 200, but rather as illustrative of one of a variety of examples.

Figure 8:
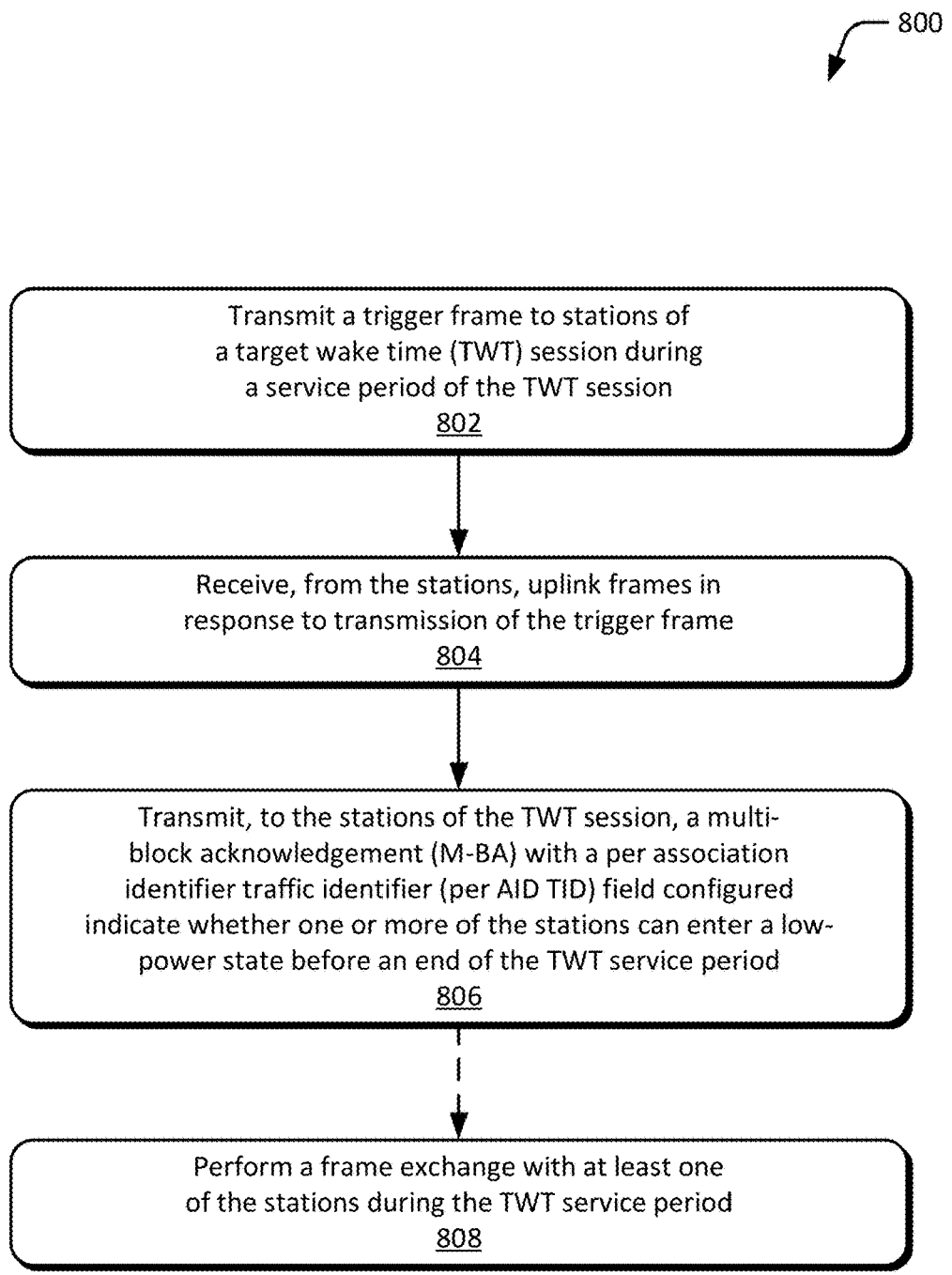
FIG. 8 illustrates an example method for managing an early ending of a TWT service period with a per association identifier traffic identifier (per AID TID) field.

FIG. 8 depicts an example method 800 for managing an early ending of a TWT service period with a per AID TID field, including operations performed by the TWT controller 120 or the TWT controller 132.

At 802, a trigger frame of a frame exchange is transmitted by an access point to stations of a TWT session during a service period of the TWT session. The trigger frame may be a trigger frame of an UL MU frame exchange between the access point and the stations of the TWT session. In some cases, the cascade indication of the trigger frame transmitted by the access point is set to zero. Some of the stations may support or be capable of interpreting a more data field of an M-BA and some others of the stations may not be capable of interpreting a more data field of the M-BA.

At 804, uplink frames are received, at the access point, from the stations in response to transmission of the trigger frame. The uplink frames may be received from multiple ones of the stations as part of the UL MU frame exchange.

At 806, an M-BA is transmitted to the stations with a per AID TID field configured to indicate whether one or more of the stations are permitted to enter a low-power state before an end of the TWT service period. The M-BA frame can be effective to cause at least one of the stations to enter the low-power state before the end of the TWT service period. In some cases, a reserved bit in the per AID TID field of the M-BA frame provides an indication of more data for the one of the stations identified by the AID of the per AID TID field. In other cases, the per AID TID field of the M-BA frame is configured to indicate whether the one or more stations are to use the more data field of the MAC layer header of the M-BA frame to determine if the low-power state is permitted. Alternately or additionally, the per AID TID field may be effective to cause one or more of the stations to disregard the more data field of the M-BA frame when determining whether the low-power state is permitted.

Optionally at 808, a frame exchange is performed with at least one of the stations during the TWT service period. The frame exchange can be performed with at least another of the stations that was not permitted to enter the low-power state before the end of the service period.

Figure 9:
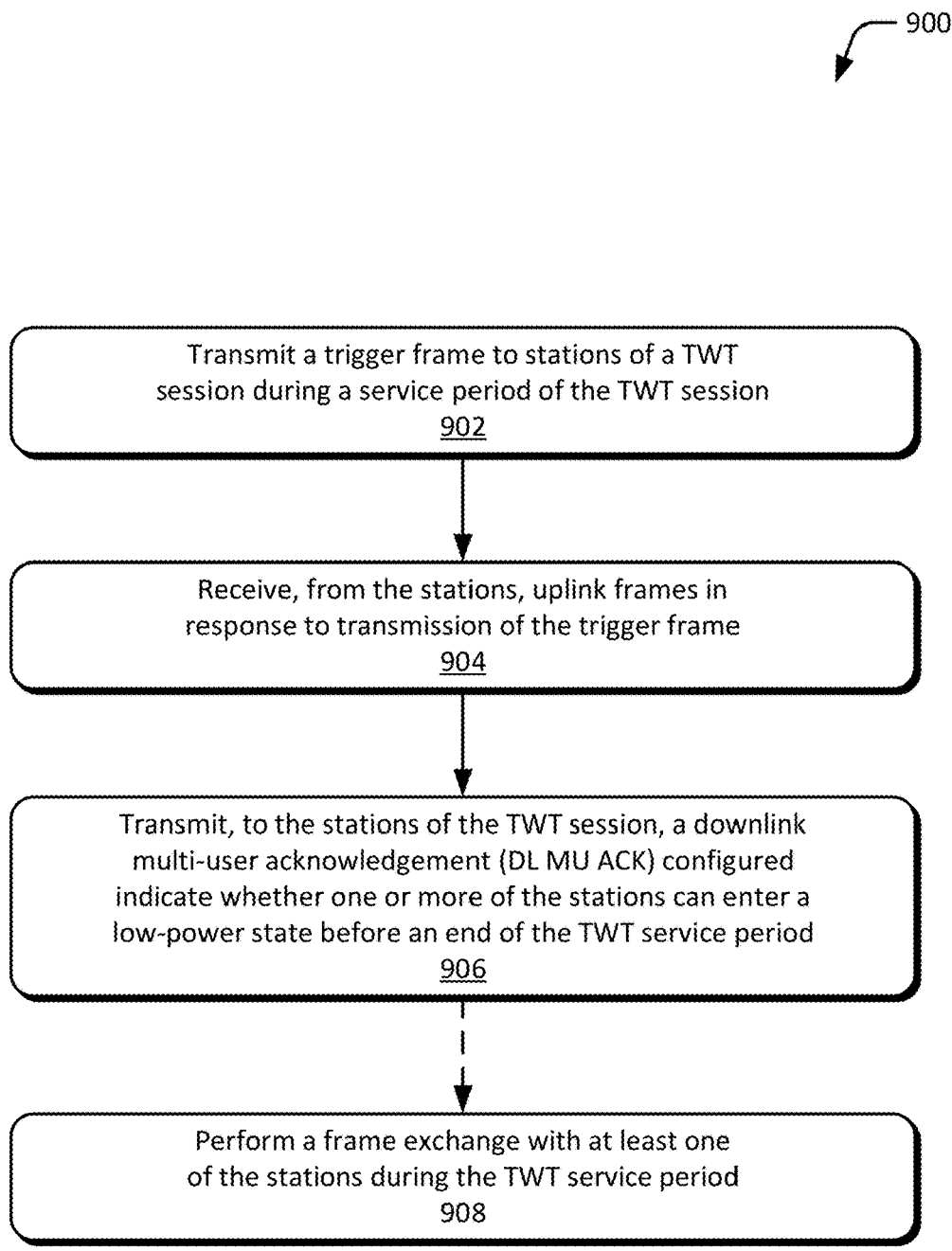
FIG. 9 illustrates an example method for managing an early ending of a TWT service period with a downlink multi-user acknowledgement (DL MU ACK).

FIG. 9 depicts an example method 900 for managing an early ending of a TWT service period with a DL MU ACK, including operations performed by the TWT controller 120 or the TWT controller 132.

At 902, a trigger frame of a frame exchange is transmitted by an access point to stations of a TWT session during a service period of the TWT session. The trigger frame may be a trigger frame of an UL MU frame exchange between the access point and the stations of the TWT session. Some of the stations may support or be capable of interpreting a more data field of an M-BA and some others of the stations may not be capable of interpreting an M-BA.

At 904, uplink frames are received, at the access point, from the stations in response to transmission of the trigger frame. The uplink frames may be received from multiple ones of the stations as part of the UL MU frame exchange.

At 906, a downlink multi-user acknowledgement (DL MU ACK) is transmitted to the stations. The DL MU ACK indicates whether one or more of the stations can enter a low-power state before an end of the TWT service period. Thus early ending of the TWT service period can be managed with the DL MU ACK instead of a M-BA, which some devices may be unable to interpret or use correctly.

Optionally at 908, a frame exchange is performed with at least one of the stations during the same TWT service period. The frame exchange can be performed with at least another of the stations that was not permitted to enter the low-power state before the end of the service period. In other words, at least some of the stations of the TWT may sleep or doze with additional frame exchanges are performed with others of the stations.

Figure 10:
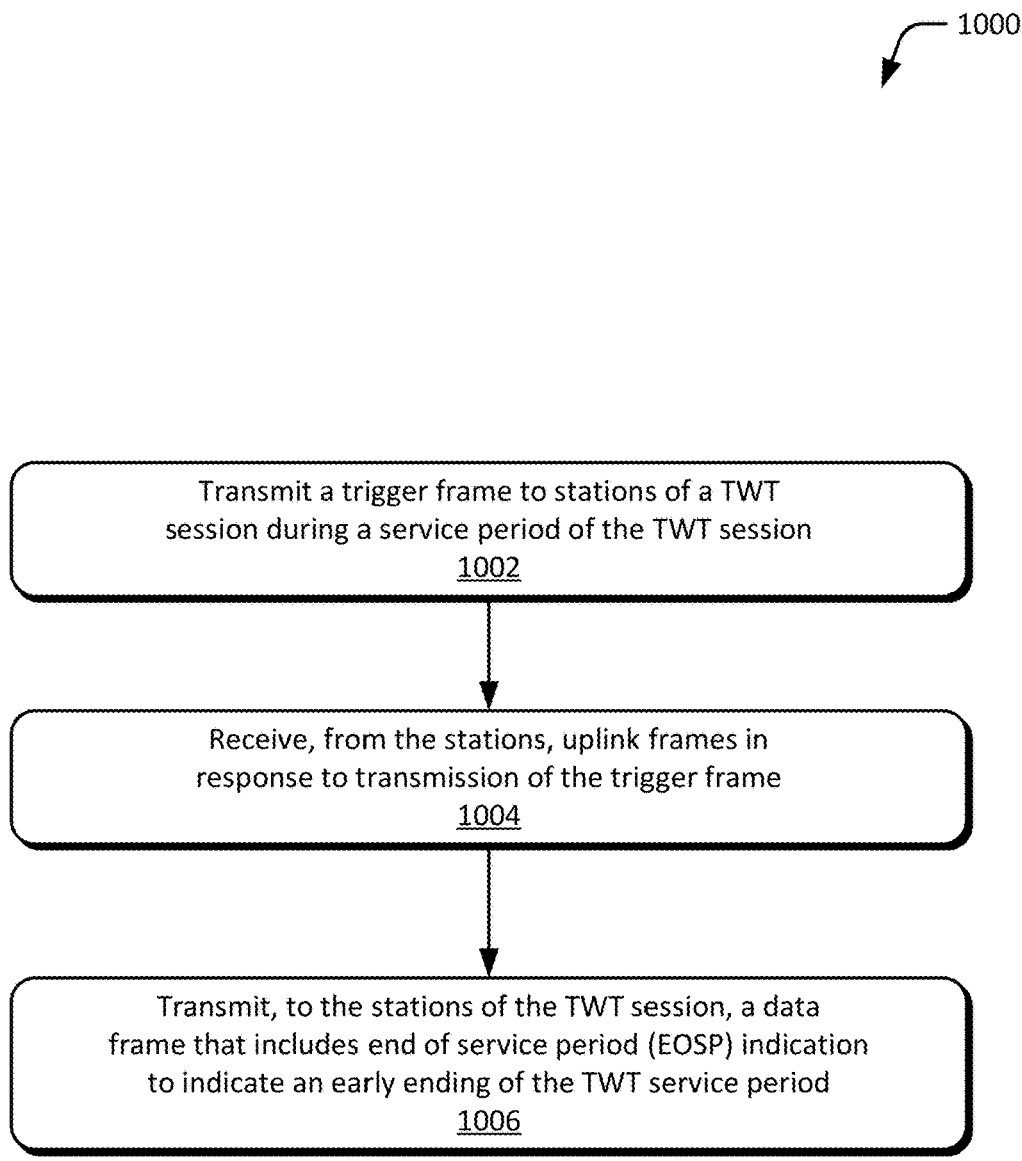
FIG. 10 illustrates an example method for managing an early ending of a TWT service period with a cascade indication or an end of service period (EOSP) indication.

FIG. 10 depicts an example method 1000 for managing an early ending of a TWT service period with a cascade indication or an EOSP indication, including operations performed by the TWT controller 120 or the TWT controller 132.

At 1002, a trigger frame is transmitted by an access point to stations of a TWT session during a service period of the TWT session. The trigger frame may be a trigger frame of an UL MU frame exchange between the access point and the stations of the TWT session. In some cases, the cascade indication of the trigger frame transmitted by the access point is set to zero, which may indicate that there is no more additional data for the stations to receive. As such, the cascade indication can be effective to signal an early ending of the service period for one or more of the stations.

At 1004, the access point receives frames transmitted by the stations in response to transmission of the trigger frame. The uplink frames may be received from multiple ones of the stations as part of the UL MU frame exchange.

At 1006, a data frame that includes an end of service period (EOSP) indication is transmitted to the stations of the TWT session. The EOSP may be transmitted as part of a data frame sent to one or more of the stations of the TWT session. In some cases, the EOSP is transmitted as part of a QoS null data frame, which often requires less processing overhead than a management frame. Alternately or additionally, another trigger frame may be transmitted with a cascade indication of zero, such that after a subsequent UL MU exchange, the stations may enter a doze state when there is no additional data to receive.

Figure 11:
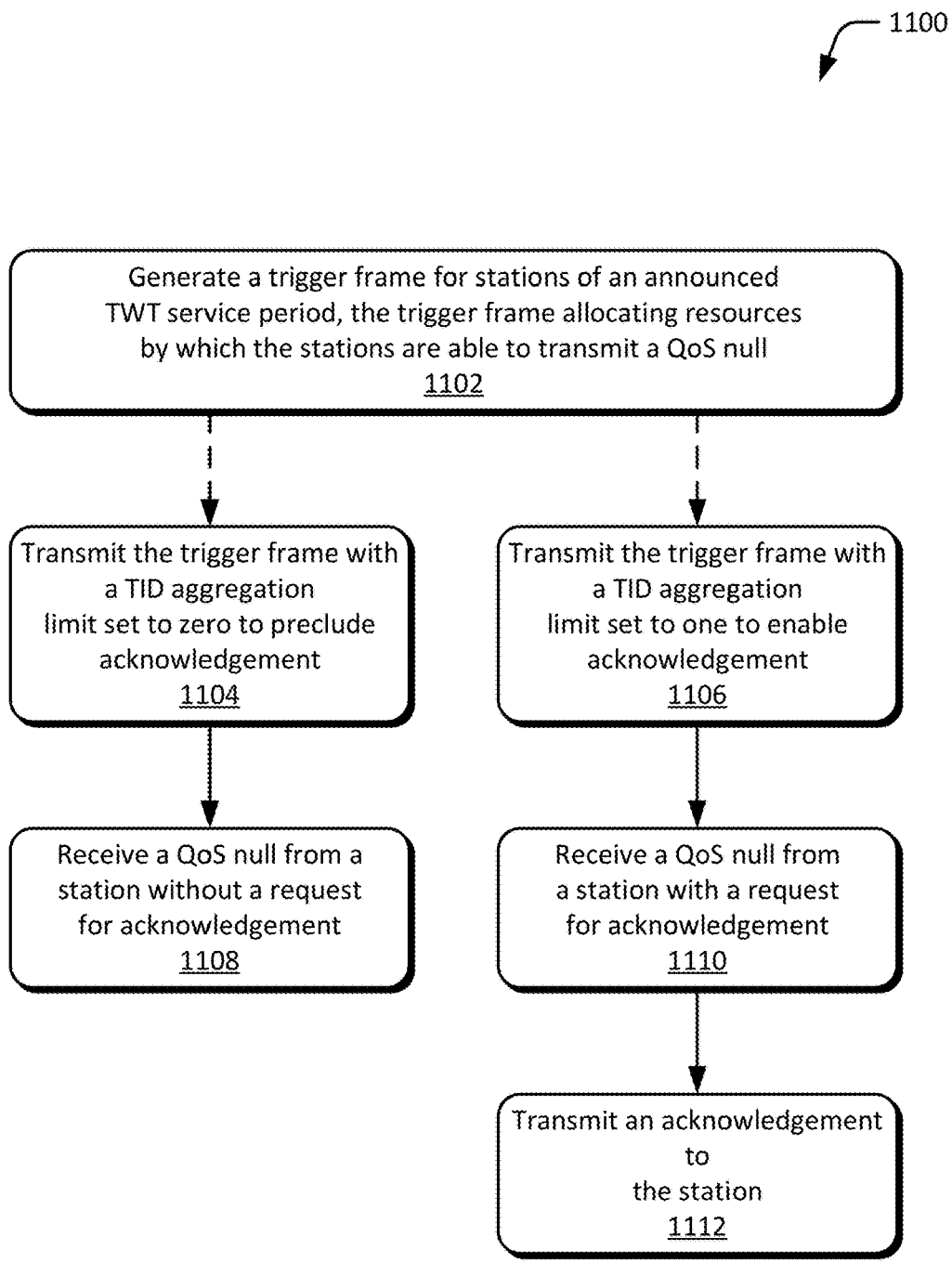
FIG. 11 illustrates an example method for implementing quality-of-service-based (QoS-based) acknowledgment in an announced TWT service period.

FIG. 11 depicts an example method 1100 for implementing quality-of-service-based (QoS-based) acknowledgment in an announced TWT service period, including operations performed by the TWT controller 120 or the TWT controller 132.

At 1102, a trigger frame is generated for stations of an announced TWT service period. The trigger frame includes an allocation of resources by which the stations are able to transmit a QoS null frame. From operation 1102, the method 1100 may proceed to operation 1104 or to operation 1106 based on a value of a TID aggregation limit.

Optionally at 1104, the trigger frame is transmitted to a station with a TID aggregation limit set to zero to preclude acknowledgement. By so doing, an indication is made to the station that an acknowledgement to a subsequent QoS null frame does not need to be transmitted.

Optionally at 1106, the trigger frame is transmitted to a station with a TID aggregation limit set to one to enable acknowledgement. By so doing, an indication is made to the station that an acknowledgement to a subsequent QoS null frame can be requested as part of the frame exchange between the access point and the station.

At 1108 and from operation 1104, a QoS null frame is received from the station without a request for acknowledgment. Based on the TID aggregation limit being set to zero, the station transmits the QoS null frame to the access point without requesting acknowledgment for reception of the QoS null frame.

At 1110 and from operation 1106, a QoS null frame is received from a station with a request for acknowledgement. Based on the TID aggregation limit being set to one, the station transmits the QoS null frame to the access point with a request for acknowledgment of the QoS null frame.

At 1012, an acknowledgement is transmitted to the station in response to the QoS null frame. To complete the acknowledgement of the QoS null frame, the access point transmits an acknowledgement frame to the station as requested and as permitted with the TID aggregation limit being set to one (instead of zero).

Figure 12:
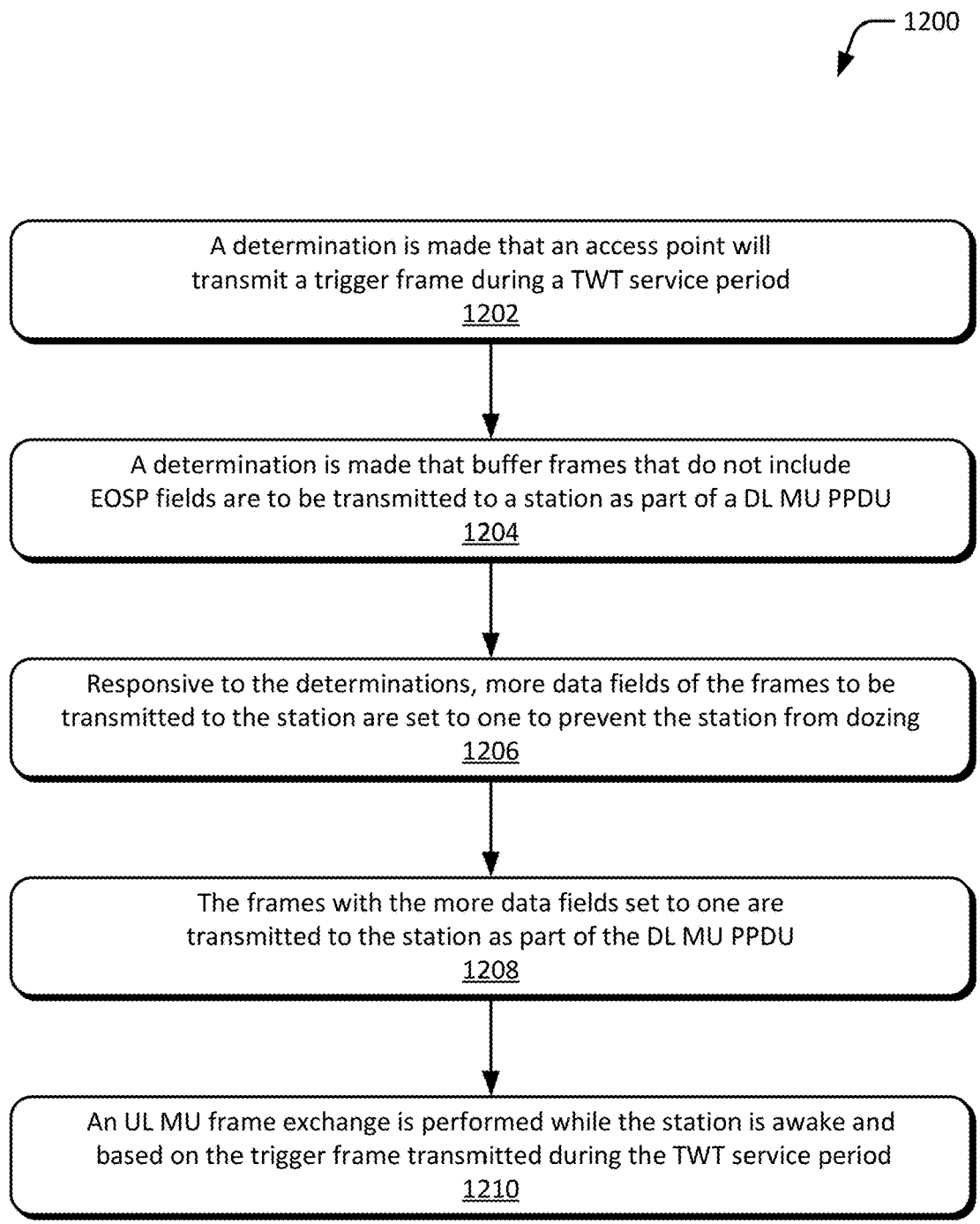
FIG. 12 illustrates an example method of using a more data field of a downlink multi-user (DL MU) frame to enable a station to participate in a subsequent uplink frame exchange.

FIG. 12 depicts an example method 1200 of using a more data field of a DL MU frame to enable a station to participate in a subsequent uplink frame exchange, including operations performed by the TWT controller 120 or the TWT controller 132.

At 1202, a determination is made that an access point will transmit a trigger frame during a TWT service period. For example, a TWT controller of the access point may determine that a solicitation for a UL MU frame exchange will be made at some point after a DL MU frame exchange of the TWT service period.

At 1204, a determination is made that buffer frames that do not include end of service period (EOSP) fields are to be transmitted to a station as part of a downlink multi-user protocol data unit (DL MU PPDU). In some cases, the DL MU PPDU includes various types of data frames that do not include an EOSP field, which could be used to indicate an early ending of TWT service period.

At 1206, responsive to the determinations, more data fields of the frames to be transmitted to the station are set to one to prevent the station from dozing. For example, a TWT controller of the access point may set the more data fields of the frames to one to provide an indication to the stations that additional data will be transmitted or more data will be solicited for transmission to the access point.

At 1208, the frames with the more data fields set to one are transmitted to the station as part of the DL MU PPDU. By transmitting the frames with the more data fields set to one, the TWT controller can prevent one or more of the stations from entering a doze date or low-power state, which would prevent those stations from participating in an uplink frame exchange later in the service period.

At 1210, an uplink multi-user (UL MU) frame exchange is performed while the station is awake and based on the trigger frame during the TWT service period. Based on the frames of the DL MU PPDU that have more data fields set to one, the stations can be forced to stay awake during the TWT service period to transmit uplink frames to the access point. After the UL MU the stations may doze or be configured by the access point to remain awake for additional frame exchanges during the TWT service period.

Figure 13:
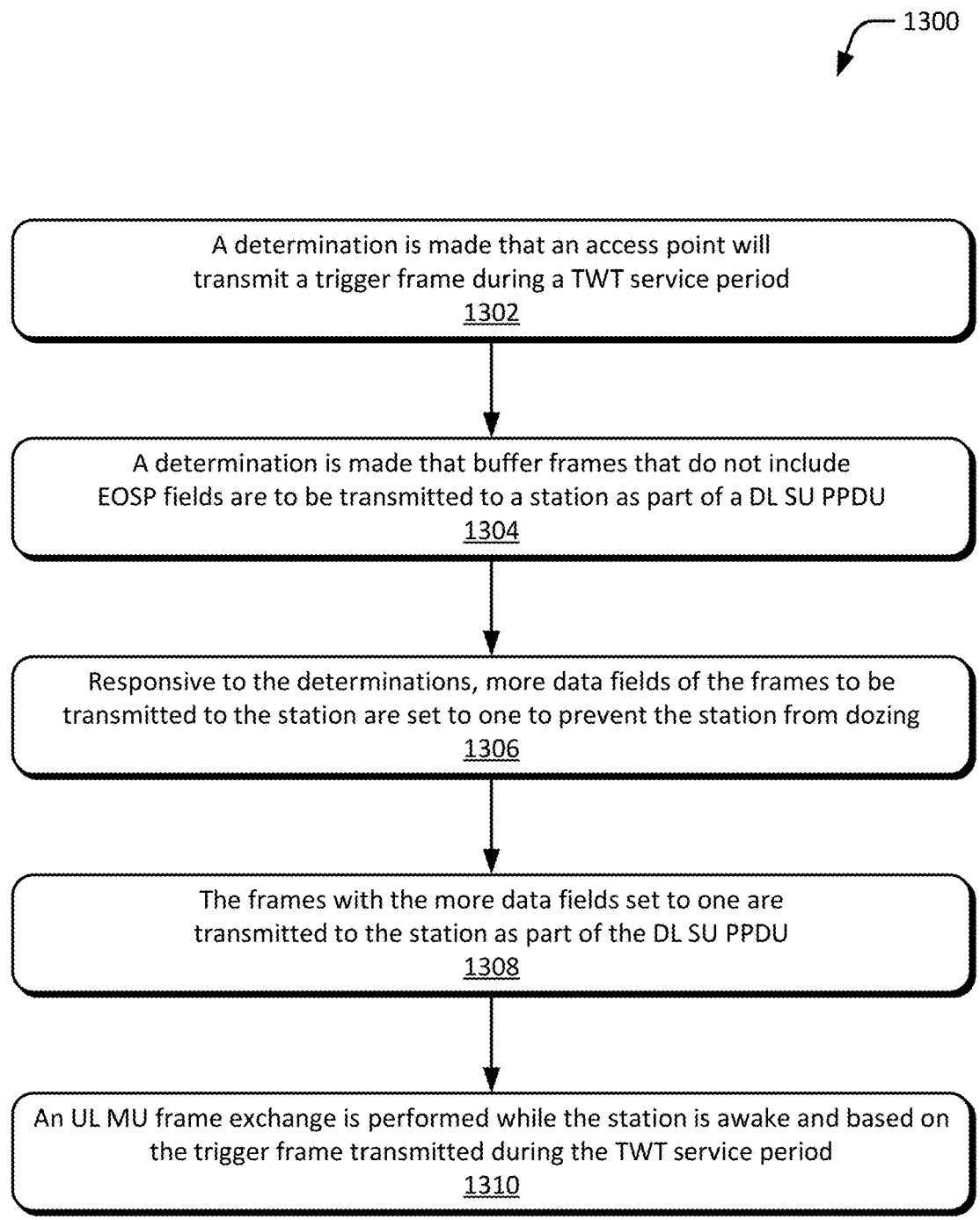
FIG. 13 illustrates an example method of using a more data field of a downlink single-user (DL SU) frame to enable a station to participate in a subsequent uplink frame exchange.

FIG. 13 depicts an example method 1300 of using a more data field of a DL SU frame to enable a station to participate in a subsequent uplink frame exchange, including operations performed by the TWT controller 130 or the TWT controller 132.

At 1302, a determination is made that an access point will transmit a trigger frame during a TWT service period. For example, a TWT controller of the access point may determine that a solicitation for a UL MU frame exchange will be made at some point after a DL SU frame exchange of the TWT service period.

At 1304, a determination is made that buffer frames that do not include end of service period (EOSP) fields are to be transmitted to a station as part of a downlink single-user protocol data unit (DL SU PPDU). In some cases, the DL SU PPDU includes various types of data frames that do not include an EOSP field, which could be used to indicate an early ending of TWT service period.

At 1306, responsive to the determinations, more data fields of the frames to be transmitted to the station are set to one to prevent the station from dozing. For example, a TWT controller of the access point may set the more data fields of the frames to one to provide an indication to the stations that additional data will be transmitted, or that additional data will be solicited for transmission to the access point.

At 1308, the frames with the more data fields set to one are transmitted to the station as part of the DL SU PPDU. By transmitting the frames with the more data fields set to one, the TWT controller can prevent one or more of the stations from entering a doze date or low-power state, which would prevent those stations from participating in an uplink frame exchange later in the service period.

At 1310, an uplink multi-user (UL MU) frame exchange is performed while the station is awake and based on the trigger frame during the TWT service period. Based on the frames of the DL SU PPDU that have more data fields set to one, the stations can be forced to stay awake during the TWT service period to transmit uplink frames to the access point. After the UL MU the stations may doze or be configured by the access point to remain awake for additional frame exchanges during the TWT service period.

Figure 14:
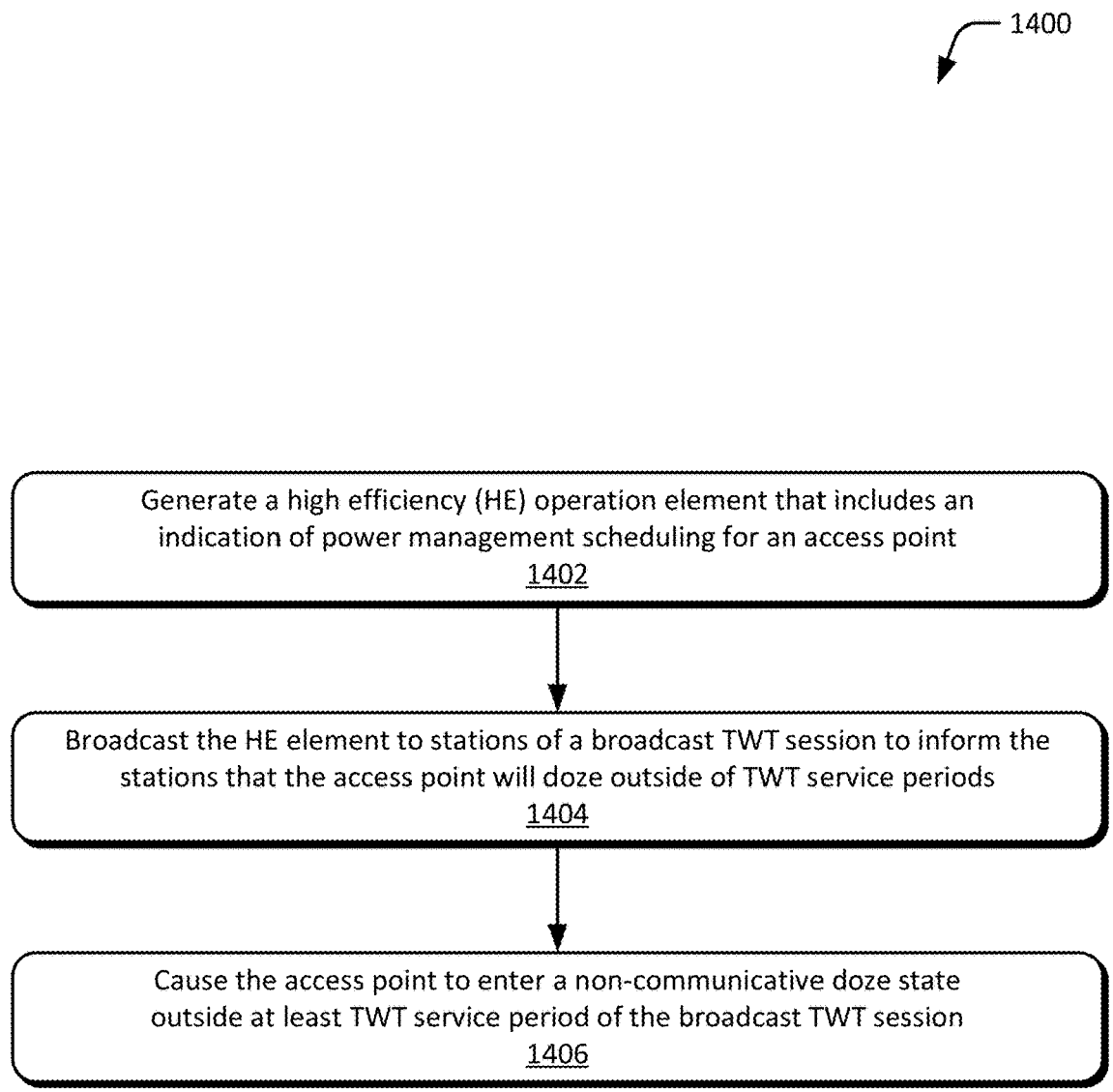
FIG. 14 illustrates another example method for enabling an access point to enter a low-power state outside of a TWT service period.

FIG. 14 depicts an example method 1400 for enabling an access point to enter a low-power state outside of a TWT service period, including operations performed by the TWT controller 120 or the TWT controller 132.

At 1402, a high efficiency (HE) operation element is generated that includes an indication of power management for an access point. In some cases, the indication of the power management is provided by a scheduling power management (PM) mode bit located at a thirty-first-bit position (B31) of an HE operation element.

At 1404, the HE element is broadcast to station of a broadcast TWT session to inform the stations that the access point will doze outside of TWT service periods of the broadcast TWT session. Alternately or additionally, when all stations associated with the TWT scheduling access point support broadcast TWT sessions and the TWT required field is set to one in the HE operation element 600, the access point can enter a sleep state outside of the broadcast TWT service periods.

At 1406, the access point is caused to enter a non-communicative doze state outside at least one TWT service period of the broadcast TWT session. In some cases, the access point is caused to enter the doze state once all of the stations are forced to join the broadcast TWT session and/or each station associated with the access point is one or both of a TWT requestor and a TWT scheduled station.

Figure 15:
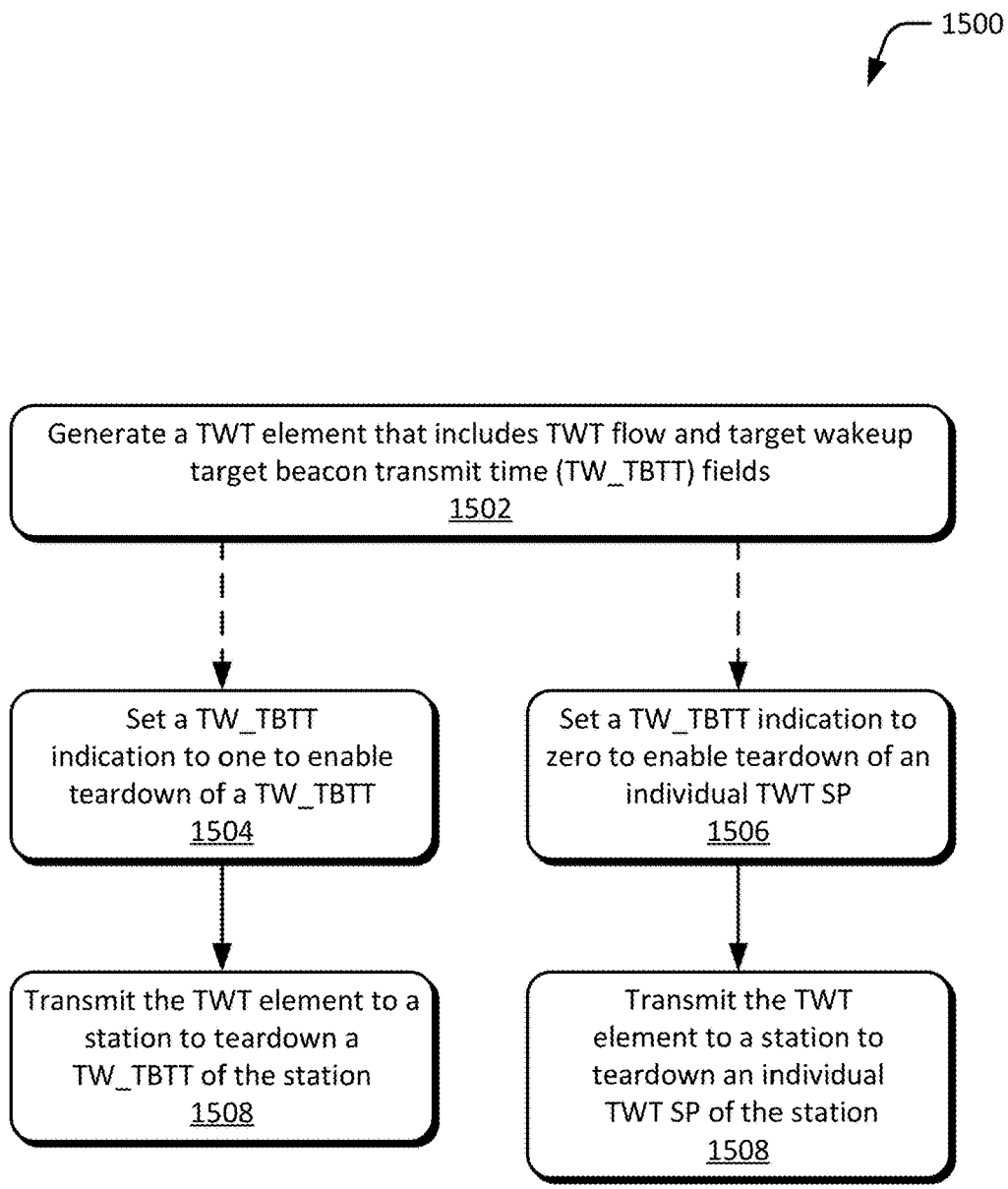
FIG. 15 illustrates an example method for tearing down a TW_TBTT and/or an individual TWT service period of a TWT session.

FIG. 15 depicts an example method 1500 for tearing down a TW_TBTT and/or an individual TWT service period of a TWT session, including operations performed by the TWT controller 120 or the TWT controller 132.

At 1502, a TWT element is generated that includes a TWT flow and target wakeup target beacon transmit time (TW_TBTT) fields. This TWT element can be used to implement teardown of either a TW_TBTT of a station or an individual TWT service period of a station, which conventional TWT action frames are unable to do.

At 1504, a TW_TBTT indication of the TW_TBTT field is set to one to enable teardown of a TW_TBTT of a station. For example, a TWT controller of an access point can set the TW_TBTT indication of the TW_TBTT field to one in order to prepare to teardown a TW_TBTT of a station.

At 1506, the TW_TBTT indication of the TW_TBTT field is set to zero to enable teardown of an individual TWT service period of a station. For example, a TWT controller of an access point can set the TW_TBTT indication of the TW_TBTT field to zero in order to prepare to teardown an individual TWT service period of a station.

At 1508 and from operation 1504, the TWT element with the TW_TBTT indication set to one is transmitted to a station effective to cause the station to teardown a TW_T-BTT of the station. Thus, for a station that is configured with both a TW_TBTT and an individual TWT service period, the use of the TWT element with TWT flow and TW_TBTT fields enables the access point to tear down the TW_TBTT of the station. At 1510, the TWT element with the TW_T-BTT indication set to zero is transmitted to a station effective to cause the station to teardown an individual TWT service period of the station.

System-on-Chip

Figure 16:
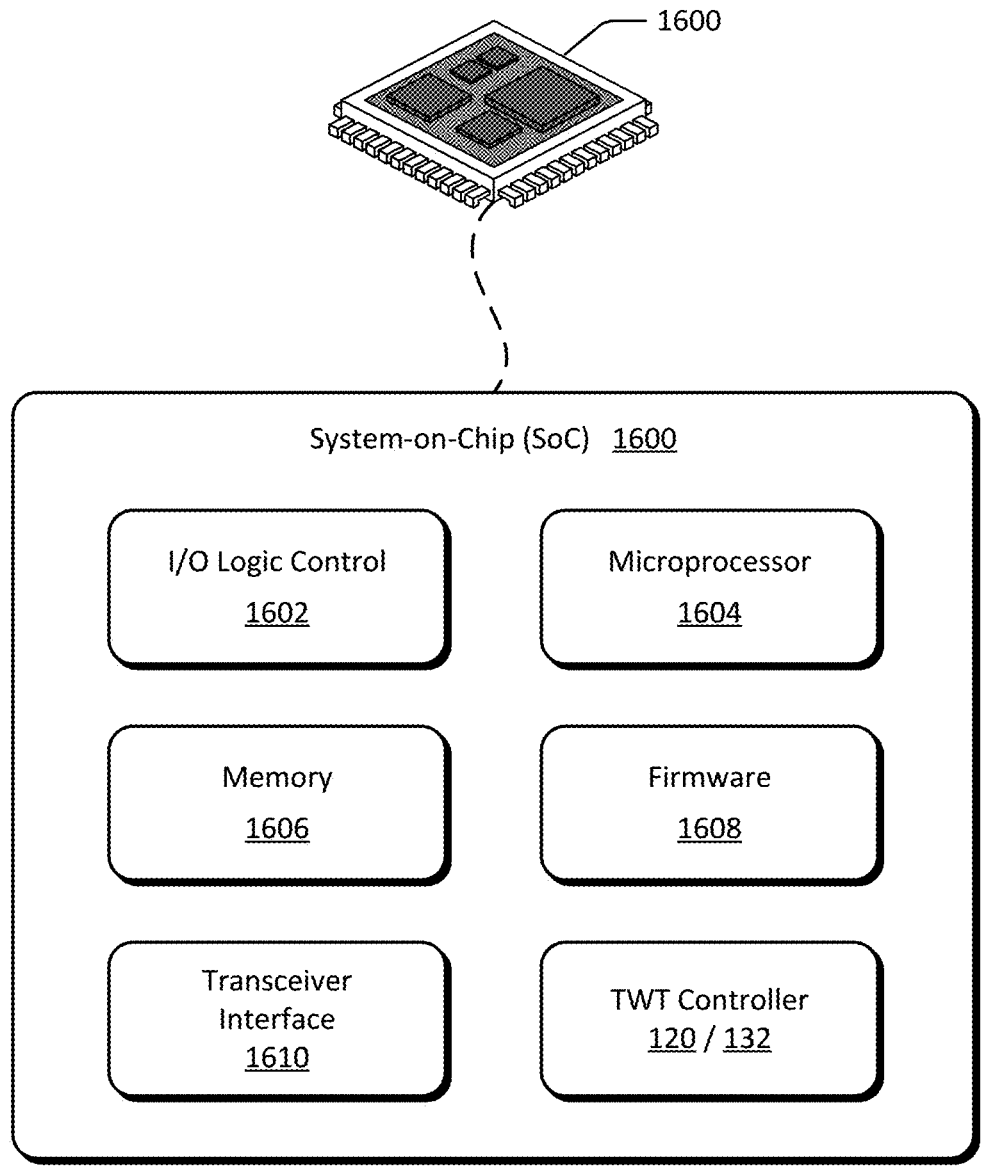
FIG. 16 illustrates an example System-on-Chip (SoC) environment for implementing aspects of improved target wake time operations.

FIG. 16 illustrates an exemplary System-on-Chip (SoC) 1600 that can implement various aspects of improved target wake time operations for wireless networks. The SoC 1600 can be implemented in any suitable device, such as an access point, station device, mobile station, wireless router, station management entity, set-top box, wireless base station, drone controller, server, mesh networking node, network-attached storage, smart appliance, or any other suitable type of device. Although described with reference to a SoC, the entities of FIG. 16 may also be implemented as a network interface controller (NIC), application-specific standard part (ASSP), digital signal processor (DSP), programmable SoC (PSoC), or field-programmable gate array (FPGA). With reference to the devices described herein, the SoC 1600 may be embodied in, or implement functionalities of, an access point or a station device in accordance with one or more aspects of improved target wake time operations.

The SoC 1600 can be integrated with electronic circuitry, a microprocessor, memory, input-output (I/O) logic control, communication interfaces, other hardware, firmware, and/or software useful to provide functionalities of a device, such as any of the devices listed herein. The SoC 1600 may also include an integrated data bus (not shown) that couples the various components of the SoC for data communication between the components. The integrated data bus or other components of the SoC 1600 may be exposed to or enable access of external components, such as for wireless communication. For example, the SoC 1600 may be implemented as a baseband processor, software-defined radio, or modem for managing or controlling a transceiver circuitry or other hardware to communicate over a wireless medium.

In this example, the SoC 1600 includes various components such as input-output (I/O) logic control 1602 (e.g., to include electronic circuitry) and a microprocessor 1604 (e.g., any of a microcontroller, processor core, application processor, or DSP). The SoC 1600 also includes memory 1606, which can be any type and/or combination of RAM, SRAM, DRAM, low-latency nonvolatile memory, ROM, one-time programmable (OTP) memory, and/or other suitable electronic data storage. In the context of this disclosure, the memory 1606 stores data, instructions, or other information via non-transitory signals, and does not include carrier waves or other transitory signals.

Alternately or additionally, the SoC 1600 may comprise a data interface (not shown) for accessing additional or expandable off-chip memory, such as external SRAM or flash memory. In some cases, the SoC 1600 includes various applications, operating systems, and/or software, such as firmware 1608, which can be computer-executable instructions maintained by the memory 1606 and executed by the microprocessor 1604. In this example, the SoC 1600 includes a transceiver interface 1610 for controlling or communicating with components of a local or off-chip wireless transceiver. Generally, the transceiver interface 1610 may be implemented with or to control components, such as the transmitter 122 and receiver 124, to facilitate communication between devices of a wireless network.

The SoC 1600 also includes a TWT controller 120, which may be embodied as a disparate entity or combined components, such as a processor, communication controller, or the transceiver interface 1610. Examples of these components and/or entities, and their corresponding functionality, are described with reference to the respective components of the environment 100 shown in FIG. 1 and wireless network shown in FIG. 2. Further, although described with reference to components of an access point 102, an SoC 1600 may also be implemented as and with components of a station device 104 of the environment 100 (e.g., TWT controller 132). The TWT controller 120, either in whole or part, can be implemented as processor-executable instructions (e.g., firmware 1608) maintained by the memory 1606 and executed by the microprocessor 1604 to implement various aspects and/or features of improved target wake time operations as described herein.

The TWT controller 120 and/or TWT controller 132, either independently or in combination with other entities, can be implemented with any suitable combination of components or circuitry to implement various aspects and/or features described herein. The TWT controller 120 or 132 may also be provided integral with other entities of the SoC 1600, such as integrated with the microprocessor 1604, a network interface controller, or the transceiver interface 1610 the SoC 1600. Alternately or additionally, the TWT controller 120 or 132 and the other components can be implemented as hardware, firmware, fixed logic circuitry, or any combination thereof.

Although the subject matter has been described in language specific to structural features and/or methodological operations, it is to be understood that the subject matter defined in the appended claims is not necessarily limited to the specific features or operations described herein, including orders in which they are performed.

What is claimed is:

1. A method comprising:

transmitting, from an access point, a trigger frame to stations of a target wake time (TWT) session during a TWT service period of the TWT session;

receiving, at the access point, respective uplink frames from the stations in response to transmission of the trigger frame; and transmitting, from the access point, a multi-block acknowledgment (M-BA) frame with a per association identifier traffic identifier (per AID TID) field configured to indicate whether one or more of the stations are permitted to enter a low-power state before an end of the TWT service period, the M-BA frame effective to cause at least one of the stations to enter the low-power state before the end of the TWT service period, the per AID TID field of the M-BA frame being configured to provide an indication as to whether the one or more stations are to use a more data field of the media access control (MAC) layer header of the M-BA frame to determine if the low-power state is permitted.

2. The method as recited in claim 1, further comprising performing, after transmission of the M-BA frame, a frame exchange during the service period with at least another of the stations that was not permitted to enter the low-power state before the end of the service period.

3. The method as recited in claim 1, wherein a reserved bit in the per AID TID field of the M-BA frame provides the indication that the one or more stations are to use the more data field of the MAC layer header of the M-BA frame to determine if the low-power state is permitted.

4. The method as recited in claim 1, wherein transmission of the trigger frame, reception of the respective uplink frames, and transmission of the M-BA frame are performed as part of an uplink multi-user (UL MU) frame exchange performed during the TWT service period.

5. The method as recited in claim 1, wherein the configuration of the per AID TID field is effective to cause one or more of the stations to disregard a more data field of the M-BA frame when determining whether the low-power state is permitted.

6. The method as recited in claim 1, wherein the access point provides a wireless network in accordance with an Institute of Electrical and Electronics Engineers 802.11ax standard.

7. The method as recited in claim 1, wherein the low-power state is a doze state or a sleep state of the one or more stations.

8. A System-on-Chip (SoC) comprising:
a wireless communication controller;
a target wake time (TWT) controller implemented at least partially in hardware and configured to:
transmit, via the wireless communication controller, a trigger frame to stations of a TWT session during a TWT service period of the TWT session;
receive, via the wireless communication controller, respective uplink frames from the stations in response to transmission of the trigger frame; and
transmit, via the wireless communication controller, a multi-block acknowledgment (M-BA) frame with a per association identifier traffic identifier (per AID TID) field configured to indicate whether one or more of the stations are permitted to enter a low-power state before an end of the TWT service period, the M-BA frame effective to cause at least one of the stations to enter the low-power state before the end of the TWT service period, the per AID TID field of the M-BA frame being configured to provide an indication as to whether the one or more stations are to use a more data field of the media access control (MAC) layer header of the M-BA frame to determine if the low-power state is permitted.

9. The SoC as recited in claim 8, wherein the TWT controller is further configured to perform, after causing transmission of the M-BA frame, a frame exchange during the service period with at least another of the stations that was not permitted to enter the low-power state before the end of the service period.

10. The SoC as recited in claim 8, wherein a reserved bit in the per AID TID field of the M-BA frame provides the indication that the one or more stations are to use the more data field of the MAC layer header of the M-BA frame to determine if the low-power state is permitted.

11. The SoC as recited in claim 8, wherein the transmission of the trigger frame, reception of the respective uplink frames, and transmission of the M-BA frame are performed as part of an uplink multi-user (UL MU) frame exchange performed during the TWT service period.

12. The SoC as recited in claim 8, wherein the configuration of the per AID TID field is effective to cause one or more of the stations to disregard a more data field of the M-BA frame when determining whether the low-power state is permitted.

13. The SoC as recited in claim 8, wherein the wireless communication controller is configured to provide a wireless network in accordance with an Institute of Electrical and Electronics Engineers 802.11ax standard.

14. The SoC as recited in claim 8, wherein the SoC is embodied in whole or as part of an access point, a station device, a smart-phone, a broadband router, a wireless base station, a set-top box, a vehicle-based computing system, a smart appliance, or an Internet-of-Things device.

15. A computer-readable storage media comprising instructions that, responsive to execution by a hardware-based processor, implement a target wake time controller (TWT) controller to:
transmit, via a wireless interface associated with the hardware-based processor, a trigger frame to stations of a TWT session during a TWT service period of the TWT session;
receive, via the wireless interface associated with the hardware-based processor, respective uplink frames from the stations in response to transmission of the trigger frame; and
transmit, via the wireless interface associated with the hardware-based processor, a multi-block acknowledgment (M-BA) frame with a per association identifier traffic identifier (per AID TID) field configured to indicate whether one or more of the stations are permitted to enter a low-power state before an end of the TWT service period, the M-BA frame effective to cause at least one of the stations to enter the low-power state before the end of the TWT service period, the per AID TID field of the M-BA frame being configured to provide an indication as to whether the one or more stations are to use a more data field of the media access control (MAC) layer header of the M-BA frame to determine if the low-power state is permitted.

16. The computer-readable storage media as recited in claim 15,
wherein the TWT controller is further implemented to perform, after transmission of the M-BA frame, a frame exchange during the service period with at least another of the stations that was not permitted to enter the low-power state before the end of the service period.

17. The computer-readable storage media as recited in claim 15, wherein a reserved bit in the per AID TID field of the M-BA frame provides the indication that the one or more stations are to use the more data field of the MAC layer header of the M-BA frame to determine if the low-power state is permitted.

18. The computer-readable storage media as recited in claim 15, wherein the configuration of the per AID TID field is effective to cause one or more of the stations to disregard a more data field of the M-BA frame when determining whether the low-power state is permitted.

19. The computer-readable storage media as recited in claim 15, wherein the transmission of the trigger frame, reception of the respective uplink frames, and transmission of the M-BA frame are performed as part of an uplink multi-user (UL MU) frame exchange performed during the TWT service period.

20. The computer-readable storage media as recited in claim 15, wherein the low-power state is a doze state or a sleep state of the one or more stations of the TWT session.

* * * * *